United States Patent Office 3,171,845
Patented Mar. 2, 1965

3,171,845
20-DIFLUORO-PREGNANES AND METHODS
TO PREPARE SAME
David G. Martin and William J. Wechter, Kalamazoo,
Mich., assignors to The Upjohn Company, Kalamazoo,
Mich., a corporation of Delaware
No Drawing. Filed Jan. 4, 1961, Ser. No. 80,530
8 Claims. (Cl. 260—397.3)

This invention relates to novel steroid compounds and is more particularly concerned with novel 3,3-difluoro-, 20,20-difluoro-, and 3,3,20,20-tetrafluoropregnanes, and with a process for their preparation.

The novel compounds of the invention can be represented by the following formulae:

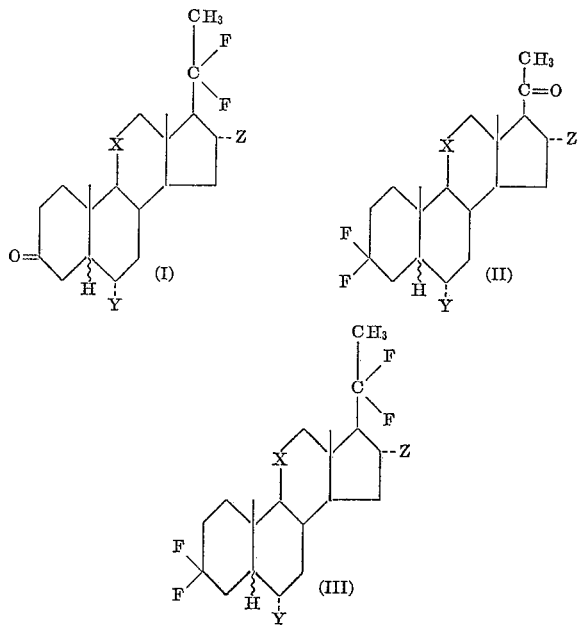

In the above formulae, X is selected from the class consisting of methylene, hydroxymethylene, and keto, Y is selected from the class consisting of hydrogen, methyl, fluorine, and chlorine, and Z is selected from the class consisting of hydrogen and methyl. The wavy line as used in the above formulae and throughout the specification is a generic expression denoting the α-configuration, the β-configuration or mixtures thereof.

The novel steroids of the invention having the Formulae I, II, and III possess valuable therapeutic activity. Thus, the novel steroids of the invention possess central nervous system depressant activity which makes them useful as sedatives and general anesthetics in mammals. For example, they can be used as sedatives and anesthetics in the laboratory manipulation of experimental animals such as mice and rats.

The novel compounds of the invention can be prepared and administered to mammals in a wide variety of oral or parenteral dosage forms singly or in admixture with other coacting compounds. They can be associated with a pharmaceutical carrier which can be solid material or a liquid in which the compound is dissolved, dispersed, or suspended. The solid compositions can take the form of tablets, powders, capsules, pills, or the like, preferably in unit dosage forms for simple administration or precise dosages. The liquid compositions can take the form of solutions, emulsions, suspensions, syrups or elixirs.

The compounds of the invention can all be prepared according to the following reaction scheme:

Reaction Scheme A:

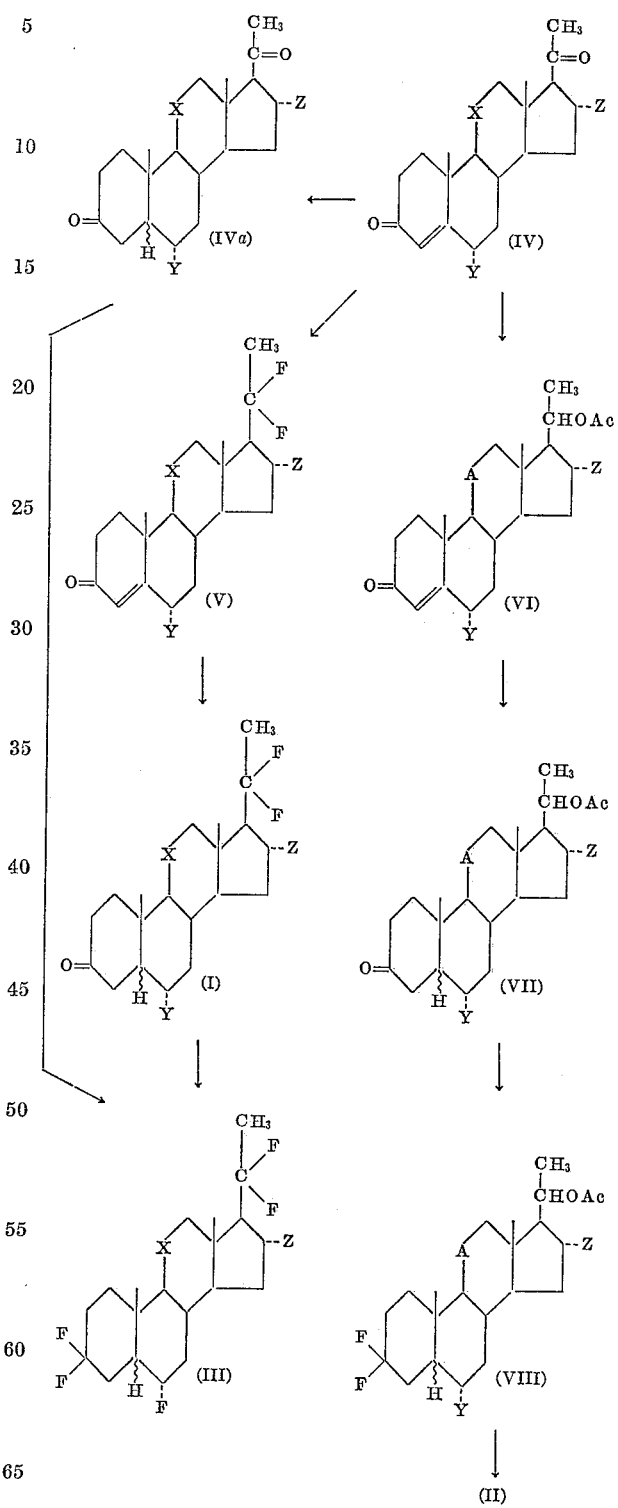

Alternatively, the compounds of the invention having the Formulae I [wherein X represents methylene or keto only] and III can be prepared according to the following reaction scheme:

Reaction Scheme B:

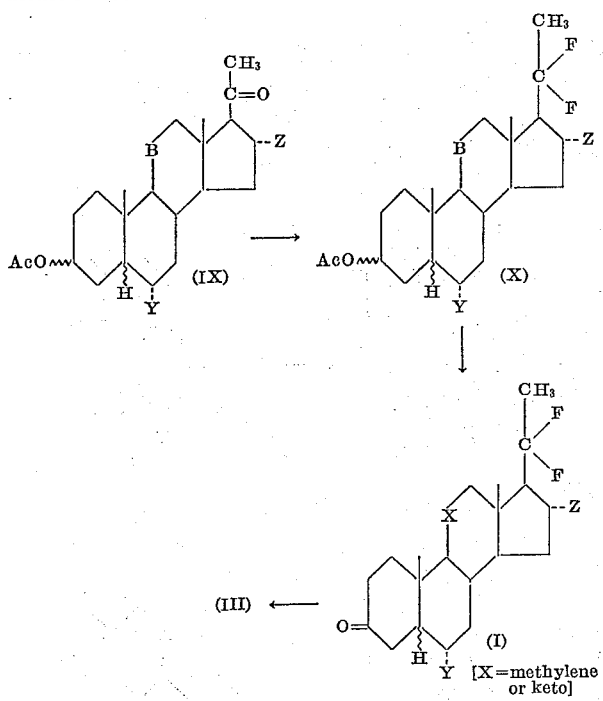

[X=methylene or keto]

In the above formulae, X, Y, and Z have the significance hereinbefore defined, Ac represents an acyl radical, preferably that of a hydrocarbon carboxylic acid containing from 1 to 12 carbon atoms, inclusive, A is selected from the class consisting of methylene and α-acyloxymethylene, and B is selected from the class consisting of methylene, keto, and α-acyloxymethylene, wherein the acyl group is preferably that of a hydrocarbon carboxylic acid containing from 1 to 12 carbon atoms, inclusive.

The term "hydrocarbon carboxylic acid" containing from 1 to 12 carbon atoms is inclusive of saturated and unsaturated aliphatic acids and aromatic acids such as acetic, propionic, butyric, isobutyric, tert-butylacetic, valeric, isovaleric, caproic, caprylic, decanoic, dodecanoic, acrylic, crotonic, hexynoic, heptynoic, octynoic, cyclobutanecarboxylic, cyclopentanecarboxylic, cyclopentenecarboxylic, cyclohexanecarboxylic, dimethylcyclohexanecarboxylic, benzoic, toluic, naphthoic, ethylbenzoic, phenylacetic, naphthaleneacetic, phenylvaleric, cinnamic, phenylpropiolic, and the like.

The novel compounds having Formulae V, VIII, and X, in addition to their value as intermediates in the preparation of the novel compounds having the Formulae I, II and III, also possess valuable therapeutic activity. For example, the novel compounds (V), (VIII) and (X) possess central nervous system depressant activity which makes them useful as sedatives and general anesthetics in mammals. Illustratively, they can be used as sedatives and anesthetics in the laboratory manipulation of experimental animals such as mice and rats. The novel compounds (V), (VIII) and (X) can be prepared and administered to mammals in the dosage forms described above for the administration of the compounds (I), (II) and (III).

The novel 20,20-difluoro compounds of the invention having the Formula I can be prepared according to either of the reaction schemes A or B above. Thus, in accordance with the reaction scheme A above progesterone or substituted progesterones having the Formula IV are fluorinated using (as fluorinating agent) sulfur tetrafluoride in the presence of a Lewis acid to yield the corresponding 20,20-difluoroprogesterones (V). The term "Lewis acid" is well recognized in the art and is defined by Fieser and Fieser, "Organic Chemistry," Third Edition, page 138 (Reinhold, 1956). Examples of such compounds are hydrogen fluoride, boron trifluoride, arsenic trifluoride, phosphorus pentafluoride, titanium tetrafluoride, and the like. The preferred Lewis acid for use in the above reaction is hydrogen fluoride.

The fluorination of a compound having the Formula IV is carried out by treating the latter compound with sulfur tetrafluoride in the presence of a Lewis acid and an inert solvent at a temperature within the range of about 0° C. and about 100° C. The term "inert solvent" means any organic solvent which does not interfere with the fluorination process by entering into side reactions with any of the reactants employed therein. Such inert solvents include aromatic hydrocarbons such as benzene, toluene, xylene and the like, saturated aliphatic hydrocarbons such as hexane, heptane, octane, dodecane, cyclohexane, cycloheptane, and the like, and partially halogenated saturated hydrocarbons such as methylene chloride, ethylene dichloride, ethylidene chloride, propylene chloride, trimethylene chloride, and the like. The preferred solvents are the partially halogenated saturated hydrocarbons particularly methylene chloride and ethylene dichloride.

The fluorination of the compounds (IV) is carried out conveniently in a closed vessel the inner surface of which is made of a material, such as stainless steel, which is resistant to chemical attack by hydrogen fluoride. The compound (IV), the inert solvent, and the Lewis acid are charged into the vessel in any order, but the sulfur tetrafluoride is generally charged in last. Where the Lewis acid to be employed is hydrogen fluoride, the requisite amount of hydrogen fluoride can be charged into the vessel from an external source or, alternatively and preferably, the desired quantity of hydrogen fluoride can be liberated in the reaction vessel by introducing therein an amount of water calculated to give the desired quantity of hydrogen fluoride by reaction with sulfur tetrafluoride according to the following equation:

$$SF_4 + H_2O \rightarrow SOF_2 + 2HF.$$

Sulfur tetrafluoride is a gas at ordinary temperatures, i.e. at temperatures of the order of 25° C. and can be introduced into the reaction vessel in a convenient manner by connecting the source of sulfur tetrafluoride to the reaction vessel and cooling the latter in, for example, an acetone and solid carbon dioxide bath. The amount of sulfur tetrafluoride passing into the reaction vessel can be measured by conventional procedures, for example, by observing the pressure drop over a constant volume reservoir.

The fluorination is allowed to proceed by maintaining the reaction vessel at the desired temperature i.e. between about 0° C. and about 100° C. and preferably between about 10° C. and about 25° C. for the desired time which is generally between about 2 hr. and about 60 hr. The desired product (V) is isolated from the reaction mixture by conventional procedures. For example, the reaction mixture is diluted with a solvent, advantageously the same inert solvent used in the reaction process. The solution so obtained is washed with aqueous alkali and then evaporated to dryness. The residue is purified by conventional procedures such as recrystallization, chromatography, counter-current extraction or any combination of these steps.

The amount of Lewis acid employed in the fluorination is preferably not less than 1 mole per mole of compound (IV). The upper limit of concentration of Lewis acid which can be employed is not critical and is determined by practical and economic considerations. Generally speaking, the upper limit is of the order of about 200 moles per mole of compound (IV). Preferably the amount of Lewis acid employed is within the range of about 1.3 to about 20 moles per mole of compound (IV).

The amount of sulfur tetrafluoride employed in the fluorination is advantageously not less than 2 moles per mole of compound (IV). The upper limit of sulfur tetrafluoride to be employed in the process is not critical and is determined by practical and economic considerations. Generally speaking, the upper limit is of the order of about 500 moles per mole of compound (IV). Preferably the amount of sulfur tetrafluoride employed in the process of the invention is within the range of about 13 to about 100 moles per mole of compound (IV).

The ratio of sulfur tetrafluoride to Lewis acid employed in the fluorination is, of course, governed by the limitations defined above for the concentration of each of these reactants. However, using hydrogen fluoride as Lewis acid, the mole ratio of sulfur tetrafluoride to hydrogen fluoride is preferably in the range of from about 1:0.01 to 1:3 and an especially desirable molar ratio is 1:0.22.

It is to be noted that whereas the 20-keto group in the compounds of Formula IV is readily fluorinated under the above conditions, the conjugated $\Delta^4$-3-keto group is not attacked by the fluorinating agent under the above conditions. Further, when the group X in the compounds of Formula IV represents keto, this 11-keto is not attacked under the above fluorination conditions and fluorination occurs exclusively at the 20-keto group.

Where the group X in the starting compounds of Formula IV represents α-hydroxymethylene, it is necessary to protect the 11α-hydroxy group, for example, by acylation, before subjecting the compound (IV) to fluorination. The acylation of said 11α-hydroxy group can be carried out readily by conventional procedures, for example, by reacting the hydroxy compound with the acid anhydride or acid chloride of a suitable acid, preferably a hydrocarbon carboxylic acid containing from 1 to 12 carbon atoms, inclusive, as hereinbefore defined, if desired, in the presence of an organic base such as pyridine. The 11α-acyloxy compound so obtained is then subjected to fluorination using the conditions described above and the 11α-acyloxy-20,20-difluoro compound so obtained is deacylated to give the corresponding compound (V) in which X represents an α-hydroxymethylene group. Alternatively, the deacylation of the 11α-acyloxy group can be postponed until a later stage in the synthesis of the compounds (I). The deacylation can be effected using conventional procedures, for example, by treatment with mineral acid, advantageously at elevated temperatures such as the boiling point of the mixture, in aqueous solution or in aqueous methanol, aqueous ethanol and the like.

The compound (V) in which X represents a β-hydroxymethylene group can be obtained from the corresponding compound (V) in which X represents a keto group by ketalization of the 3-keto group in the latter compound, followed by reduction of the 11-keto 3-ketal using lithium aluminum hydride to give the corresponding 11β-hydroxy 3-ketal which is then hydrolized to yield the desired compound. These steps of ketalization, reduction and deketalization can be effected, for example, using the procedure described by Levin et al. J. Am. Chem. Soc. 76, 546 (1954) for the conversion of 4-chloro-17α-hydroxy-pregnane-3,11,20-trione to 4-chloro-11β,17α-dihydroxypregnane-3,20 - dione. Similarly, the compound (V) in which X represents keto can be converted to the corresponding compound in which X represents α-hydroxymethylene by ketalization of the 3-keto group in the starting compounds (V) [X=keto], reduction of the 11-keto-3-ketal using sodium in a lower alkanol according to the procedure described in U.S. Patent 2,751,379, and hydrolysis of the resulting 11α-hydroxy 3-ketal.

The final stage in the synthesis of the compounds (I) consists in the hydrogenation of the $\Delta^4$-double bond in the compounds (V). The hydrogenation can be effected using conventional procedures, for example, by hydrogenation of the compound (V) using a hydrogenation catalyst such as a palladium-on-charcoal catalyst according to the procedure described in U.S. Patent 2,647,135 for the conversion of 11α-hydroxyprogesterone to 11α-hydroxy-5α- and 11α-hydroxy-5β- pregnane-3,20-dione. The hydrogenation leads to the formation of a mixture of the 5α- and 5β-epimers of the desired compound (I) which mixture can be separated by conventional techniques such as fractional crystallization, counter-current distribution using a suitable solvent system, chromatography, for example, using a diatomaceous earth (Celite) and activated charcoal column, or by any combination of these steps.

Where the group X in the compound (I) represents hydroxymethylene, said compound can be oxidized to the corresponding 11-keto compound, for example, using chromic acid according to the procedure described in U.S. Patent 2,676,181, or using an N-haloamide or N-haloimide, e.g. N-bromoacetamide in pyridine or like amine as described in U.S. Patent 2,751,402.

An alternative method of synthesis of the compounds having the Formula I is shown in reaction scheme B. In this alternative, a 5α- or 5β-pregnan-3α- or 3β-ol-20-one 3-acylate having the Formula IX is subjected to fluorination using sulfur tetrafluoride in the presence of a Lewis acid under the conditions hereinbefore described. There is thus obtained the corresponding 20,20-difluoro compound having the Formula X. In the next step of the synthesis, the compound (X) is subjected to hydrolysis, for example, by treatment with mineral acid, advantageously at elevated temperatures such as the boiling point of the mixture, in aqueous solution or in aqueous lower alkanol solution such as aqueous methanol, aqueous ethanol, and the like. The 3-acyloxy group in the compound (X) is thereby hydrolyzed to a free hydroxy group, and, where the group B in the compound (X) represents α-acyloxymethylene, this group will be hydrolyzed to the free α-hydroxymethylene group. The 3α-hydroxy or 3α,11α-dihydroxy compound so obtained is then oxidized, for example, using chromic acid according to the procedure described in U.S. Patent 2,676,181, or using an N-haloamide or N-haloimide, e.g. N-bromoacetamide in pyridine or like amine as described in U.S. Patent 2,751,402. The 11α-hydroxy group, when present, will be oxidized simultaneously to an 11-keto group. The above three-step synthesis yields the compounds of the Formula I wherein X represents methylene or keto. The compounds having the Formula I wherein X represents β-hydroxymethylene can be obtained from the corresponding compound (I) wherein X represents keto by the method hereinbefore described.

The novel 3,3,20,20-tetrafluoro compounds of the invention having the Formula III can be prepared, as shown in reaction scheme A, by fluorination of the corresponding compounds having the Formula I using sulfur tetrafluoride under the conditions hereinbefore described where the group X in the starting compound of Formula I represents keto. This keto group is much less readily fluorinated than the 3-keto group and the latter is fluorinated selectively under the fluorination conditions described above. Where the group X in the starting compound (I) represents α-hydroxymethylene, it is necessary to protect the hydroxy group, for example, by acylation, before subjecting the compound (I) to fluorination. The acylation of said 11α-hydroxy group can be carried out readily by conventional procedures, for example, by reacting the hydroxy compound with the acid anhydride or acid chloride of a suitable acid, preferably a hydrocarbon carboxylic acid containing from 1 to 12 carbon atoms, inclusive, as hereinbefore defined, if desired, in the presence of an organic base such as pyridine. The 11α-acyloxy compound so obtained is then subjected to fluorination using the conditions described above and the 11α-acyloxy-3,3,20,20-tetra-fluoro compound so obtained is decylated to give the desired compound (III) in which X represents α-hydroxymethylene. The deacylation can be effected using conventional procedures, for example, by treatment with mineral acid, advantageously at elevated temperatures such as the boiling point of the mixture, in aqueous solution or in aqueous lower-alkanol solution such as aqueous methanol, aqueous ethanol and the like.

The compound (III) wherein X represents β-hydroxymethylene can be obtained from the corresponding compound (III) wherein X represents keto by reduction, for example, with lithium aluminium hydride using the procedure described by Levin et al., supra. Similarly, reduction of the compound III [X=keto] using sodium in a lower alkanol according to the procedure described in U.S. Patent 2,751,379 gives the corresponding compound (III) in which X is α-hydroxymethylene.

Alternatively, the 3,3,20,20-trifluoro compounds having the Formula III can be prepared from the corresponding compounds having the Formula IV according to the following procedure. The compound (IV) is subjected to hydrogenation to saturate the $\Delta^4$ double bond and yield a mixture of the 5α- and 5β-epimers of the corresponding 4,5-saturated compound (IVa). This mixture can be separated into its components using the procedures described above. The hydrogenation can be effected using the conditions described above for the conversion of the 20,20-difluoro compounds (V) to the compounds having the Formula I. The compound (IVa) (either 5α or 5β-epimer) so obtained is then subjected to fluorination using sulfur tetrafluoride under the conditions hereinbefore described whereby the 3-keto and the 20-keto groups are simultaneously fluorinated to yield the desired compound (III). Where the compound (IVa) contains an 11-keto group, i.e. X represents keto, the 3-keto and 20-keto groups will be fluorinated preferentially without effect on the 11-keto group under the reaction conditions described above. Where the group X in the compound (IVa) represents α-hydroxymethylene, it is necessary to protect the free hydroxy group, for example, by acylation as hereinbefore described before subjecting the compound (IVa) to fluorination. The 11a-acyloxy group in the resulting compound (III) can then be deacylated using the procedure hereinbefore described. The resulting compound (III) in which X represents α-hydroxymethylene can then be converted, if desired, to the corresponding compound (III) in which X represents keto using procedures hereinbefore described for the oxidation of an 11-hydroxy compound to the corresponding 11-keto compound. As previously shown, the compound (III) wherein X represents α- or β-hydroxymethylene can be obtained from the corresponding compound (III) wherein X represents keto by reduction, for example, with lithium aluminium hydride using the procedure described by Levin et al., supra, to give the β-hydroxymethylene compound or with sodium in a lower alkanol according to U.S. Patent 2,751,379 to give the α-hydroxymethylene compound.

The 3,3-difluoro compounds of the invention having the Formula II can be prepared according to reaction scheme A in the following manner. The appropriate starting material having the Formula IV is subjected to reduction using 0.8 to 1.5 equivalents of sodium or potassium borohydride at a temperature of between −10° C. and 10° C. in an organic solvent such as methanol, ethanol, isopropanol, dioxane, pyridine and the like whereby the 20-keto group present in the starting material is selectively reduced to the corresponding alcohol. The conditions employed are preferably those described in U.S. Patent 2,870,141. Alternatively, the selective reduction of the 20-keto group of the compound (IV) can be accomplished by first converting the compound (IV) to corresponding 3-enamine by reaction with a secondary amine such as pyrrolidine in accordance with the procedure described in U.S. Patent 2,781,342. The 3-enamine so obtained is then treated with lithium aluminum hydride in a suitable solvent such as tetrahydrofuran, ether, dioxane, and the like at a temperature between about 20° C. and the boiling point of the solvent whereby the 20-keto group in the 3-enamine compound is reduced to the corresponding alcohol. Finally the 3-enamine group is removed by hydrolysis, for example, by treatment with a solution containing sodium acetate, water, acetic acid and methanol, to liberate the 3-keto group. The above series of reactions is preferably carried out according to the procedure described in the aforesaid U.S. Patent 2,870,141.

Where the group X in the starting compound IV represents keto, it is preferable to use the sodium borohydride method of reduction since under these conditions the 11-keto group will be unaffected.

The 20-hydroxy compound obtained by either of the above procedures will be a mixture of the 20α- and 20β-hydroxy compounds, but it is unnecessary to separate this mixture before proceeding with further steps in the synthesis.

The 20-hydroxy compound derived by reduction of the compound (IV) is then acylated to give the compound (VI). The acylation is carried out using conventional procedures, for example, by treatment of the 20-hydroxy compound with the acid chloride or acid anhydride of a hydrocarbon carboxylic acid as hereinbefore defined, if desired, in the presence of an organic base such as pyridine. When the group X in the starting compound (IV) represents α-hydroxymethylene this hydroxymethylene group will be converted to the corresponding acyloxy methylene group during the acylation.

The compound (VI) so obtained is then treated to convert the $\Delta^4$ double bond to the corresponding 4,5-saturated bond thereby yielding the corresponding compound (VII). This step is carried out by hydrogenation advantageously using the procedures previously described above for the conversion of the compounds having Formula V to the compounds having the Formula I. The hydrogenation of the compound (VI) in this manner gives rise to a mixture of 5α- and 5β-epimers of the compound (VII) and the mixture of epimers can be separated at this stage or can be employed as such in the next stage of the synthesis leaving the separation to be accomplished at the next or a subsequent stage. At whatever stage the mixture of isomers is separated, the separation can be accomplished by conventional techniques such as fractional crystallization, counter-current distribution using a suitable solvent system, chromatography, for example, using a diatomaceous earth (Celite) and activated charcoal column, or by any combination of these steps.

It is to be understood that, in the subsequent stages of the synthesis of compound (II), the 5α- or 5β-epimers can be employed according to the particular epimer of (II) which is to be synthesized. Alternatively, a mixture of 5α- and 5β-epimers of (VII) can be carried through the subsequent stages leaving the separation of the epimers to be carried out at any of the stages.

The compound (VII) (either 5α, 5β- or a mixture thereof) so obtained is then subjected to fluorination using sulfur tetrafluoride under the conditions described above whereby the corresponding 3,3-difluoro compound (VIII) is obtained. The latter compound is then deacylated and the free 20-hydroxy (or free 11α,20-dihydroxy compound if the group A in compound (VIII) represents α-acyloxymethylene) is subjected to oxidation to convert the 20-hydroxy group to a 20-keto group (and the 11α-hydroxy, if such is present, to the 11-keto) and yield the desired compound (II). The deacylation of the compound (VIII) is carried out using conventional hydrolysis procedures, for example, by treatment with mineral acid, advantageously at elevated temperatures such as the boiling point of the mixture, in aqueous solution or in aqueous lower-alkanol solution such as aqueous methanol, aqueous ethanol, and the like. The oxidation of the resulting 20- hydroxy or 11,20-dihydroxy compound to the corresponding ketone (II) can be carried out using, for example, chromic acid according to the procedure described in U.S. Patent 2,676,181, or using an N-haloamide or N-haloimide, e.g. N-bromoacetamide in pyridine or like amine as described in U.S. Patent 2,751,402.

Where the compound (II) so obtained contains a keto group in the 11-position said compound can be converted as previously described to the 11β-hydroxymethylene compound using the method of Levin et al., supra, or to the corresponding 11α-hydroxy-methylene compound using the method of U.S. Patent 2,751,379.

The compound (II) can, if desired, be subjected to fluorination using the procedure hereinbefore described to produce the corresponding 3,3,20,20-tetrafluoro compound (III). Where the group X in the compound (II) represents α-hydroxymethylene, it is necessary to protect this group, for example, by acylation before fluorination followed by deacylation after fluorination. The acylation and deacylation can be effected using the procedures hereinbefore described.

The compounds having the Formula IV which are employed as starting materials in the above described processes are for the most part known or can be obtained readily from known materials. The known compounds of Formula IV includes progesterone, 11α-hydroxyprogesterone, 11-ketoprogesterone, 6α-fluoroprogesterone, 6α-chloroprogesterone, 6α-methylprogesterone, 6α-methyl-11-ketoprogesterone, 16α-methylprogesterone, 11α-hydroxy-16α-methylprogesterone, and 16α-methyl-11-ketoprogesterone. The 6α-fluoro- and 6-α-chloro-16α-methylprogesterone can be obtained from 16α-methyl-5-pregnen-3-ol-20-one acetate using the procedure described in U.S. Patent 2,838,528 by treatment of the latter compound with a peracid, such as performic, peracetic, or perbenzoic acid to obtain 16α-methyl-5α,6α-oxidopregnan-3-ol-20-one acetate; treating the latter compound with hydrogen fluoride or hydrogen chloride to give the corresponding 16α-methyl-6β-fluoro- or 6β-chloropregnan-3β,5α-diol-20-one 3-acetate; hydrolyzing the latter compound under acid conditions, for example, with boron trifluoride, to yield 16α-methyl-6β-fluoro- or 6β-chloropregnan-3β,5α-diol-20-one; treating the 16α-methyl-6β-fluoro- or 6β-chloropregnane-3β,5α-diol-20-one with an oxidizing agent such as sodium dichromate in acetic acid to produce 16α-methyl-5α-hydroxy-6β-fluoro- or 6β-chloropregnan-3,20-dione and dehydrating the thus obtained 16α-methyl-5α-hydroxy-6β-fluoro- or 6β-chloropregnane-3,20-dione using concentrated acid such as hydrochloric acid or concentrated base such as concentrated aqueous sodium hydroxide or potassium hydroxide, to obtain 6α-fluoro- or 6α-chloro-16α-methylprogesterone. The reaction product obtained in the dehydration is a mixture of the 6α- and 6β-epimers. The 6β-epimers can be separated from the 6α-epimers by conventional procedures, for example, by chromatography and the 6β-epimer so isolated can be converted to the 6α-epimer by treatment with an enolising agent such as strong acid or base.

The 6α-fluoro- and 6α-chloro-16α-methylprogesterone and 6α-fluoro- and 6α-chloroprogesterone can be converted to the corresponding 11α-hydroxy compounds by microbiological oxidation using, for example, the procedures described in U.S. Patents 2,602,769, 2,649,400, 2,649,401, and 2,649,402. The 11α-hydroxy compounds so obtained can then be converted to the corresponding 11-keto compounds by oxidation, for example, using chromic acid according to the procedure described in U.S. Patent 2,676,-181, or using an N-halomide or N-haloimide, for example, N-bromoacetamide in pyridine or like amine as described in U.S. Patent 2,751,402.

Alternatively, the 6α-fluoro or 6α-chloro-11-oxygenated-16α-methyl-progesterones having the Formula IV can be prepared from the corresponding 11-oxygenated-16α-methylprogesterone using the procedure described in U.S. Patent 2,838,501 for the conversion of 11-oxygenated progesterones to 6α-fluoro-11-oxygenated-progesterones.

The 6α,16α-dimethylprogesterone starting material of Formula IV can be obtained from the known compound Δ⁵-6,16-dimethylpregnen-3-ol-20-one (British Patent 841,-003) by oxidation with, for example, chromic acid or by Oppenauer oxidation. The corresponding 11-hydroxy compound and 11-keto compound can be obtained from 6α,16α-dimethylprogesterone using the procedures hereinbefore described.

The compounds of Formula IX which are employed as starting materials in reaction scheme B are for the most part known. These compounds can be obtained from the corresponding compounds having the Formula IVa by selective reduction of the 3-keto group using a metal borohydride such as sodium borohydride, lithium borohydride and the like, according to the procedure described in U.S. Patent 2,647,134, followed by acylation of the resulting 3-hydroxy compound (acylation of the 11α-hydroxymethylene group if present will also occur), for example, by reaction of the 3-hydroxy compound with the appropriate acid anhydride or acid halide, if desired, in the presence of a tertiary organic amine. The reduction of the 3-keto group using the above described procedure will yield a 3α-hydroxy compound where the configuration at C₅ in the starting compound (IVa) is β. Conversely, the reduction yields a 3β-hydroxy compound where the configuration at C₅ in the starting compound (IVa) is α.

The following preparations and examples are illustrative of the process and products of the present invention but are not to be construed as limiting.

PREPARATION 1

*6α-fluoro-16α-methylprogesterone*

A mixture of 20 g. of 16α-methyl-5-pregnen-3β-ol-20-one acetate (Marker et al., J. Amer. Chem. Soc. 64, 1280, 1942), 4 g. of anhydrous sodium acetate and 20 ml. of 40% peracetic acid in 400 ml. of chloroform is stirred for 2 hrs. at 0° C. to 4° C. The reaction mixture is then washed with water and aqueous sodium bicarbonate and evaporated to dryness. The residue is recrystallized from a mixture of methylene chloride and acetone. Thus is thus obtained 3β-hydroxy-16α-methyl-5α,6α-oxidopregnan-20-one acetate in the form of a crystalline solid.

To 6.9 g. of anhydrous hydrogen fluoride in a cooled container is added 5 ml. of chilled chloroform (stabilized with a trace of alcohol) and 13.24 ml. of tetrahydrofuran. To this solution is added 4.1 g. of 3β-hydroxy-16α-methyl-5α,6α-oxidopregnan-2-one acetate (prepared as described above) in 25 ml. of chilled chloroform. The solution so obtained is kept for 2 hrs. at −10° C. and then poured into excess aqueous sodium bicarbonate solution with stirring. The resulting mixture is extracted with methylene chloride and the methylene chloride solution is extracted with water and evaporated to dryness. The residue is recrystallized from a mixture of methylene chloride and ethyl acetate to give 6β-fluoro-3β,5α-dihydroxy-16α-methylpregnan-20-one acetate in the form of a crystalline solid.

A mixture of 1 g. of 6β-fluoro-3β,5α-dihydroxy-16α-methylpregnan-20-one acetate, 25 ml. of methanol and 1 ml. of boron trifluoride-etherate is heated under reflux for 15 minutes and then concentrated before being poured into water. The solid which separates is isolated by filtration and recrystallized from ethyl acetate to give 6β-fluoro-3β,5α-dihydroxy-16α-methylpregnan-20-one.

One gram of 6β-fluoro-3β,5α-dihydroxy - 16α - methylpregnan-20-one is added to 25 ml. of acetic acid and immediately 1 g. of sodium dichromate dihydrate dissolved in 10 ml. of acetic acid is added while the reaction mixture is stirred and cooled. The resulting mixture is allowed to stand overnight at approximately 25° C. and then 2 ml. of methanol is added to destroy excess oxidant before pouring the mixture into water. The solid which separates is isolated by filtration and dried. There is thus obtained 6β-fluoro-16α-methyl-5α-hydroxypregnane-3,20-dione.

Anhydrous hydrogen chloride is passed into a suspension of 2 g. or 6β-fluoro-16α-methyl-5α-hydroxypregnane-3,20-dione in 200 ml. of chloroform (containing 0.75% ethanol) for 0.5 hr. after which nitrogen is passed through the solution for 15 minutes. The solution so obtained is then washed with cold water and with aqueous sodium bicarbonate solution. The washed solution is evaporated to dryness and the resulting mixture of 6α- and 6β-fluoro-16α-methyl progesterone is separated by fractional crystallization from a mixture of acetone and Skellysolve B (a mixture of hexanes). The 6β-fluoro-16α-methylprogesterone so obtained is converted to the 6α-epimer by heating under reflux in a mixture of ethanol and aqueous hydrochloric acid for 30 minutes, pouring the resulting mixture into a large excess of water and isolating the precipitated solid.

PREPARATION 2

*6α-chloro-16α-methylprogesterone*

Anhydrous hydrogen chloride is passed into a solution of 5 g. of 3β-hydroxy-16α-methyl-5α,6α-oxidopregnan-20-one acetate (prepared as described in Preparation 1) in 200 ml. of chloroform at 0° C. until the solution is saturated. The resulting solution is then allowed to stand for a short period at 0° C. before being poured into excess aqueous sodium bicarbonate solution with stirring. The organic layer is separated, washed with water, and evaporated to dryness. The residue is recrystallized from a mixture of methylene chloride and ethyl acetate to give 6β-chloro-3β-hydroxy-16α-methyl-5α,6α-oxidopregnan-20-one acetate. The latter compound is then converted to 6α-chloro-16α-methylprogesterone using the procedure described to Preparation 1 for the conversion of the corresponding 6β-fluoro-3β-hydroxy-16α-methyl-5α,6α-oxidopregnan-20-one acetate to 6α-fluoro-16α-methylprogesterone.

PREPARATION 3

*6α-fluoro-11α-hydroxy-16α-methyl-progesterone and 6α-fluoro-11-keto-16α-methylprogesterone*

A solution is prepared containing 10 g. of 11α-hydroxy-16α-methylprogesterone (Schneider et al., J. Amer. Chem. Soc. 81, 3167, 1959) and 0.5 g. of p-toluenesulfonic acid in 100 ml. of benzene and 20 ml. of ethylene glycol. The solution so obtained is refluxed vigorously with rapid stirring for 4 hr. using a water trap to remove the water formed in the reaction. The resulting solution is cooled, washed with aqueous sodium bicarbonate solution, then with water and dried. The dried solution is evaporated and to the residue is added hot ethyl acetate. The hot solution so obtained is cooled and diluted with ether and the solid which separates is isolated by filtration and dried. There is thus obtained 11α-hydroxy-16α-methylprogesterone 3,20-bis (ethylene ketal) in the form of a crystalline solid.

A solution of 5 g. of the 11α-hydroxy-16α-methylprogesterone 3,20-bis (ethylene ketal) so obtained in 70 ml. of chloroform is added with stirring to a suspension of 1 g. of anhydrous sodium acetate in 10 ml. of 40% peracetic acid, cooled in an ice bath. The mixture is stirred for 2.5 hr. at ice bath temperature before being washed successively with water, aqueous sodium hydroxide, and water. The washed solution is dried and evaporated to dryness. The residue is heated briefly under reflux with about 50 ml. of methanol and the methanol solution is cooled. The solid which separates is isolated by filtration and is recrystallized from ethyl acetate. There is thus obtained 5α,6α-oxido-11α-hydroxy-16α-methylpregnane-3,20-dione 3,20-bis (ethylene ketal) in the form of a crystalline solid.

To a stirred mixture of 5.6 g. of potassium bifluoride, 1.5 ml. of acetic anhydride and 21 ml. of acetic acid is added 3 g. of 5α,6α-oxide-11α-hydroxy-16α-methylpregnane-3,20-dione 3,20-bis(ethylene ketal). The mixture so obtained is stirred at about 25° C. for 2 days before adding methylene chloride. The methylene chloride solution is washed with water and then evaporated to dryness. The residue is chromatographed on a column of synthetic magnesium silicate (Florisil) and the column is eluted with Skellysolve B (a mixture of hexanes) containing increasing proportions of acetone. The fractions eluted using 2% and 3% acetone in Skellysolve B are combined and recrystallized from methanol containing a trace of pyridine to obtain 5α,11α-dihydroxy-6β-fluoro-16β-methylpregnane-3,20-dione 3,20-bis (ethylene ketal).

A solution of 1 g. of 5α,11α-dihydroxy-6β-fluoro-16α-methylpregnane-3,20-dione 3,20-bis(ethylene ketal) in a mixture of 30 ml. of methanol and 2.5 ml. of N aqueous sulfuric acid is heated under reflux for 0.5 hr. and then concentrated. The concentrate is allowed to cool and the solid which separates is isolated by filtration and dried. There is thus obtained 5α,11α-dihydroxy-6β-fluoro-16α-methylpregnane-3,20-dione in the form of a crystalline solid.

A slurry of 0.35 g. of 5α,11α-dihydroxy-6β-fluoro-16α-methylpregnane-3,20-dione in 35 ml. of chloroform is cooled in an ice bath and saturated with gaseous hydrogen chloride. After allowing the solution to stand in the ice bath for 30 minutes, a fast stream of nitrogen is passed through the reaction mixture to remove excess hydrogen chloride. The chloroform solution so obtained is washed with water and dried over anhydrous magnesium sulfate. The dried solution is evaporated to dryness and the residue is recrystallized from a mixture of acetone and Skellysolve B. There is thus obtained 6α-fluoro-11α-hydroxy-16α-methylprogesterone in the form of a crystalline solid.

A solution of 0.5 g. of 6α-fluoro-11α-hydroxy-16α-methylprogesterone in 30 ml. of acetic acid is treated at about 25° C. with a solution of 0.15 g. of chromium trioxide in 0.5 ml. of water and the mixture is allowed to stand for approximately 0.5 hr. before destroying the excess chromium trioxide with methanol and diluting the resulting mixture with water. The reaction mixture is extracted with methylene chloride and the methylene chloride solution is dried over anhydrous magnesium sulfate. The dried solution is filtered, the filtrate is evaporated to dryness and the residue is recrystallized from methanol. There is thus obtained 6α-fluoro-11-keto-16α-methylprogesterone in the form of a crystalline solid.

PREPARATION 4

*6α-chloro-11α-hydroxy-16α-methylprogesterone and 6α-chloro-11-keto-16α-methylprogesterone*

Anhydrous hydrogen chloride is passed into a solution of 2 g. of 5α,6α-oxido-11α-hydroxy-16α-methylpregnane-3,20-dione 3,20-bis(ethylene ketal) [prepared as described in Preparation 3] in 100 ml. of chloroform at 0° C. until the solution is saturated. The solution is allowed to stand for a short period at 0° C. before being poured into excess aqueous sodium bicarbonate solution with stirring. The organic layer is separated, washed with water, and evaporated to dryness. The residue is recrystallized from a mixture of methylene chloride and ethyl acetate to give 5α,11α-dihydroxy-6β-chloro-16α-methylpregnane-3,20-dione 3,20-bis(ethylene ketal). The latter compound is then converted to 6α-chloro-11α-hydroxy-16α-methylprogesterone and 6α-chloro-11-keto-16α-methylprogesterone using the procedure described in Preparation 3 for the conversion of 5α,11α-dihydroxy-6β-fluoro-16α-methylpregnane-3,20-dione 3,20-bis(ethylene ketal) to 6α-fluoro-11α-hydroxy-16α-methylprogesterone and 6α-fluoro-11-keto-16α-methylprogesterone.

PREPARATION 5

6α,16α-dimethylprogesterone

A solution of 5 g. of 6α,16α-dimethyl-5-pregnen-3-ol-20-one (British Patent 841,003) in 50 ml. of cyclohexanone and 300 ml. of toluene is boiled to remove all traces of water and then 5 g. of aluminum tertiary butoxide is added. The solution is refluxed for 3 hr. and then concentrated to about 175 ml. The cooled concentrate is washed with aqueous sodium hydroxide solution and then with water before being dried over anhydrous sodium sulfate and filtered. The filtrate is then chromatographed over a column of synthetic magnesium silicate (Florisil). The column is eluted with Skellysolve B containing increasing proportions of acetone and those fractions, which are shown by paper chromatographic analysis to contain the desired 3,20-dione, are combined and recrystallized from aqueous ethanol. There is thus obtained 6α,16α-dimethylprogesterone in the form of a crystalline solid.

PREPARATION 6

6α,16α-dimethyl-11α-hydroxyprogesterone

A medium is prepared of 20 g. of cornsteep liquor (60% solids) and 10 g. of commercial dextrose, diluted to 1 liter and adjusted to a pH of 4.8 to 5.0. A volume of 10 l. of this sterilized medium is inoculated with a 24 hr. vegetative growth of culture *Rhizopus nigricans* (strain; ATCC 6227b) and incubated for 24 hrs. at a temperature of about 28° C. using a rate of aeration of 0.3 l. per minute at 300 r.p.m. After 24 hrs. of agitation, a solution of 2 g. of 6α16α-dimethylprogesterone (prepared as described in Preparation 5) in 20 ml. of dimethylformamide is added to the inoculated medium. After an additional 72 hr. period of incubation, the fermentation liquor and mycelium are extracted with three 1 l. portions of methylene chloride. The extracts are combined and washed with aqueous sodium bicarbonate solution and then with water before being dried and evaporated to dryness. The residue is dissolved in methylene chloride and chromatographed over a column of synthetic magnesium silicate (Florisil). The column is eluted with Skellysolve B containing increasing proportions of acetone. Those fractions of the eluate which are found by weight profile and paper chromatogram analysis to contain the desired 6α,16α-dimethyl-11α-hydroxyprogesterone are combined and recrystallized from a mixture of acetone and Skellysolve B. There is thus obtained 6α,16α-dimethyl-11α-hydroxyprogesterone in the form of a crystalline solid.

PREPARATION 7

6α-fluoro-16α-methyl-5β-pregnan-3α-ol-20-one acetate (A) *6α-fluoro-16α-methyl-5β-pregnane-3,20-dione.* — A solution of 0.25 g. of 6α-fluoro-16α-methylprogesterone in 100 ml. of ethanol containing 6 drops of triethylamine is subjected to hydrogenation at room temperature under a pressure of about 10 p.s.i.g. of hydrogen in the presence of 45 mg. of a 30% palladium-on-charcoal catalyst. When the theoretical quantity of hydrogen has been absorbed, the reaction mixture is filtered and the filtrate is evaporated to dryness. The residue, comprising a mixture of the 5α- and 5β-epimers of 6α-fluoro-16α-methylpregnane-3,20-dione, is dissolved in acetone and chromatographed on a column which has been packed wet (with methanol) with a mixture of 2 parts by weight of diatomaceous earth (Celite 545) and 1 part by weight of activated carbon (Darco G-60). The column is eluted with a mixture of methanol and acetone followed by a mixture of acetone and methylene chloride and those fractions which are determined by paper chromatogram analysis to contain the desired 5α-epimer are combined and recrystallized from aqueous ethanol. Similarly, those fractions which are determined by paper chromatogram analysis to contain the desired 5β-epimer are combined and recrystallized from aqueous ethanol. There are thus obtained the 5α- and 5β-epimers of 6α-fluoro-16α-methyl-pregnane-3,20-dione in the form of crystalline solids.

(B) *6α-fluoro-16α-methyl-5β-pregnan-3α-ol-20-one acetate.*—To a stirred solution of 0.628 millimole of 6α-fluoro-16α-methyl-5β-pregnane-3,20-dione in 30 ml. of absolute ethanol (previously distilled from sodium borohydride) at 50° C. is added 0.157 millimole (based on pure reagent) of sodium borohydride. The reaction mixture is maintained at 50° C. for about 5 minutes and then heated to boiling for about 1 minute. Hot water is added to the reaction mixture and the mixture is allowed to cool to room temperature. The solid which separates is isolated by filtration and dried. There is thus obtained 6α-fluoro-16α-methyl-5β-pregnan-3α-ol-20-one.

A mixture of 0.1 g. of 6α-fluoro-16α-methyl-5β-pregnan-3α-ol-20-one, 1 ml. of acetic anhydride and 1 ml. of pyridine is allowed to stand overnight at room temperature before being poured into water. The solid which separates is isolated by filtration, washed with water, and dried. There is thus obtained 6α-fluoro-16α-methyl-5β-pregnan-3α-ol-20-one acetate in the form of a crystalline solid.

Using the procedure described in part B above, but substituting 6α-fluoro-16α-methyl-5α-pregnane-3,20-dione for 6α-fluoro-16α-methyl-5β-pregnane-3,20-dione, there is obtained 6α-fluoro-16α-methyl-5α-pregnan-3β-ol-20-one acetate.

In like manner, using the procedure described in parts A and B above but replacing 6α-fluoro-16α-methylprogesterone employed in part A by 6α-chloro-16α-methylprogesterone, 6α-methylprogesterone, and 6α,16α-dimethylprogesterone, there are obtained 6α-chloro-16α-methyl-5β-pregnan-3α-ol-20-one acetate and 6α-chloro-16α-methyl-5α-pregnan-3β-ol-20-one acetate, 6α-methyl-5β-pregnan-3α-ol-20-one acetate and 6α-methyl-5α-pregnan-3β-ol-20-one acetate, and 6α,16α-dimethyl-5β-pregnan-3α-ol-20-one acetate, and 6α,16α-dimethyl-5α-pregnan-3β-ol-20-one acetate, respectively.

EXAMPLE 1

20,20-difluoroprogesterone

A mixture of 1 g. (0.0032 mole) of progesterone, 0.75 ml. (0.042 mole) of water, and 20 ml. of methylene chloride was charged into a 100 ml. capacity stainless steel autoclave. The autoclave was sealed and cooled in an ice bath of Dry Ice and acetone while a total of 46 g. (0.43 mole) of sulfur tetrafluoride was passed into the autoclave. The contents of the autoclave were then agitated for 16 hr. at 15° C. before being diluted with methylene chloride and washed with an excess of aqueous potassium bicarbonate solution. The washed methylene chloride solution was dried over anhydrous sodium sulfate, and the dried solution was filtered. The filtrate was evaporated to dryness and the residue was chromatographed on a column of magnesium silicate (Florisil). The column was eluted with Skellysolve B and Skellysolve B containing increasing proportions of acetone. The eluate containing 2% acetone was evaporated to dryness and the residue (0.35 g.) was recrystallized from a mixture of acetone and water. There was thus obtained 0.28 g. of 20,20-difluoroprogesterone in the form of a crystalline solid having a melting point of 112 to 114° C. An analytical sample having a melting point of 116 to 116.5° C. and $[\alpha]_D + 98°$ (chloroform) was obtained by further recrystallization from a mixture of acetone and water. The ultraviolet absorption spectrum of this material (in solution in ethanol) exhibited a maximum at 241 millimicrons.

*Analysis.*—Calcd. for $C_{21}H_{30}OF_2$: C, 74.96; H, 9.20; F, 11.29. Found: C, 75.30; H, 9.32; F, 10.95.

Using the above procedure but replacing progesterone by

11α-acetoxyprogesterone,
6α-fluoroprogesterone,
6α-chloroprogesterone,
6α-methylprogesterone,
11-keto-6α-methylprogesterone,
16α-methylprogesterone,
11α-acetoxy-16α-methylprogesterone,
11-keto-16α-methylprogesterone,
6α-fluoro-16α-methylprogesterone,
6α-chloro-16α-methylprogesterone,
11α-acetoxy-6α-fluoro-16αmethylprogesterone,
6α-fluoro-11-keto-16α-methylprogesterone,
11α-acetoxy-6α-chloro-16α-methylprogesterone,
6α,16α-dimethylprogesterone,
6α,16α-dimethyl-11-ketoprogesterone, or
11α-acetoxy-6α,16α-dimethylprogesterone there are obtained 11α-acetoxy-20,20-difluoroprogesterone,
6α,20,20-trifluoroprogesterone,
6α-chloro-20,20-difluoroprogesterone,
20,20-difluoro-6α-methylprogesterone,
11α-acetoxy-20,20-difluoro-6α-methylprogesterone,
20,20-difluoro-11-keto-6α-methylprogesterone,
20,20-difluoro-16α-methylprogesterone,
11α-acetoxy-20,20-difluoro-16α-methylprogesterone,
20,20-difluoro-11-keto-16α-methylprogesterone,
16α-methyl-6α,20,20-trifluoroprogesterone,
6α-chloro-20,20-difluoro-16α-methylprogesterone,
11α-acetoxy-16α-methyl-6α,20,20-trifluoroprogesterone,
11-keto-16α-methyl-6α,20,20-trifluoroprogesterone,
11α-acetoxy-6α-chloro-20,20-difluoro-16α-methyl-
 progesterone,
20,20-difluoro-6α,16α-dimethylprogesterone,
20,20-difluoro-11-keto-6α,16α-dimethylprogesterone, and
11α-acetoxy-20,20-difluoro-6α,16α-dimethylprogesterone,
 respectively.

The 11α-acetoxy-20,20-difluoroprogesterone so obtained can be deacylated to 11α-hydroxy-20,20-difluoroprogesterone by heating under reflux for 0.5 hr. with methanolic hydrochloric acid, diluting the product with water, concentrating to remove the methanol and isolating the solid which separates. In similar manner, 11α-acetoxy-20,20-difluoro-6α-methylprogesterone,
11α-acetoxy-20,20-difluoro-16α-methylprogesterone,
11α-acetoxy-16α-methyl-6α,20,20-trifluoroprogesterone,
11α-acetoxy-6α-chloro-20,20-difluoro-16α-methyl-
 progesterone, and
11α-acetoxy-20,20-difluoro-6α,16α-dimethylprogesterone are deacetylated to yield 20,20-difluoro-11α-hydroxy-6α-methylprogesterone,
20,20-difluoro-11α-hydroxy-16α-methylprogesterone,
11αhydroxy-16α-methyl-6α,20,20-trifluoroprogesterone,
6α-chloro-20,20-difluoro-11α-hydroxy-16α-methyl-
 progesterone and
20,20-difluoro-11α-hydroxy-6α,16α-dimethylprogesterone,
 respectively.

EXAMPLE 2

20,20-difluoro-11-ketoprogesterone

Using the procedure described in Example 1, but substituting 11-ketoprogesterone for progesterone, there was obtained 20,20-difluoro-11-ketoprogesterone in the form of a crystalline solid having a melting point of 153 to 159° C.

Analysis.—Calcd. for $C_{21}H_{28}O_2F_2$: C, 71.97; H, 8.05; F, 10.84. Found C, 72.51; H, 8.13; F, 11.35.

EXAMPLE 3

20,20-difluoro-11β-hydroxyprogesterone (A) 3-ethylene ketal of 20,20-difluoro-11-ketoprogesterone.—A mixture of 10 g. of 20,20-difluoro-11-ketoprogesterone, 0.60 g. of p-toluenesulfonic acid, 50 ml. of ethylene glycol, and 1 l. of benzene is stirred and heated under reflux. The water formed in the reaction is collected in a water trap. When the elimination of water is complete, the reaction mixture is colled, washed with aqueous sodium bicardonate solution, and then with water and dried over anhydrous sodium sulfate. The dried solution is filtered, the filtrate is evaporated to dryness and the residue is recrystallized from ethyl acetate. There is thus obtained the 3-ethylene ketal of 20,20-difluoro-11-ketoprogesterone.

(B) 3-ethylene ketal of 20,20-difluoro-11β-hydroxyprogesterone.—A slurry of 2.5 g. of the 3-ethylene ketal of 20,20-difluoro-11-ketoprogesterone in 40 ml. of benzene is added to a slurry of 0.36 g. of lithium aluminum hydride in 200 ml. of anhydrous ether at such a rate as to cause gentle refluxing. When the addition is complete, the reaction mixture is heated under reflux for 1 hr. and then cooled and hydrolyzed with water. The organic layer is separated, washed with water, and dried over anhydrous sodium sulfate. The dried solution is filtered, the filtrate is evaporated to dryness, and the residue is recrystallized from ethyl acetate. There is thus obtained the 3-ethylene ketal of 20,20-difluoro-11β-hydroxy-progesterone in the form of a crystalline solid.

(C) 20,20-difluoro-11β-hydroxyprogesterone.—A mixture of 0.5 g. of the 3-ethylene ketal of 20,20-difluoro-11β-hydroxyprogesterone, 20 ml. of acetone and 5 ml. of 3 N hydrochloric acid is heated under reflux for 4 hr. and then diluted with water. The solid which separates is isolated by filtration and dried. There is thus obtained 20,20-difluoro-11β-hydroxyprogesterone in the form of a crystalline solid.

In the manner described in parts A, B, and C above, but replacing 20,20-difluoro-11-ketoprogesterone in part A by 20,20-difluoro-11-keto-6α-methylprogesterone,
20,20-difluoro-11-keto-16α-methylprogesterone,
11-keto-16α-methyl-6α,20,20-trifluoroprogesterone, and
20,20-difluoro-11-keto-6α,16α-dimethylprogesterone, there are obtained 20,20-difluoro-11β-hydroxy-6α-methylprogesterone,
20,20-difluoro-11β-hydroxy-16α-methylprogesterone,
11β-hydroxy-16α-methyl-6α,20,20-trifluoroprogesterone,
 and
20,20-difluoro-11β-hydroxy-6α,16α-dimethylprogesterone,
 respectively.

EXAMPLE 4

20,20-difluoro-5α-pregnan-3-one and 20,20-difluoro-5β-pregnan-3-one

A solution of 0.25 g. of 20,20-difluoroprogesterone in 100 ml. of ethanol containing 6 drops of triethylamine is subjected to hydrogenation at room temperature under a pressure of about 10 p.s.i. of hydrogen in the presence of 45 mg. of a 30% palladium-on-charcoal catalyst. When the theoretical quantity of hydrogen has been absorbed, the reaction mixture is filtered and the filtrate is evaporated to dryness. The residue, comprising a mixture of 20,20-difluoro-5α-pregnan-3-one and 20,20-difluoro-5β-pregnan-3-one, is dissolved in acetone and chromatographed on a column which has been packed wet (with methanol) with a mixture of 2 parts by weight of diatomaceous earth (Celite 545) and 1 part by weight of activated carbon (Darco G-60). The column is eluted with a mixture of methanol and acetone followed by a mixture of acetone and methylene chloride and those fractions which are determined by paper chromatogram analysis to contain the desired 20,20-difluoro-5α-pregnan- 3-one are combined and recrystallized from aqueous ethanol. Similarly, those fractions which are determined by paper chromatogram analysis to contain 20,20-difluoro-5β-pregnan-3-one are combined and recrystallized from aqueous ethanol. There are thus obtained the 5α- and 5β-epimers of 20,20-difluoropregnan-3-one in the form of crystalline solids.

Using the procedure described above, but replacing 20,20-difluoroprogesterone by 20,20-difluoro-11-ketoprogesterone,
20,20-difluoro-11α-hydroxyprogesterone,
20,20-difluoro-11α-acetoxyprogesterone,
6α,20,20-trifluoroprogesterone,
6α-chloro-20,20-difluoroprogesterone,
20,20-difluoro-6α-methylprogesterone,
20,20-difluoro-11α-hydroxy-6α-methylprogesterone,
20,20-difluoro-11α-acetoxy-6α-methylprogesterone,
20,20-difluoro-11-keto-6α-methylprogesterone,
20,20-difluoro-16α-methylprogesterone,
20,20-difluoro-11α-hydroxy-16α-methylprogesterone,
20,20-difluoro-11α-acetoxy-16α-methylprogesterone,
20,20-difluoro-11-keto-16α-methylprogesterone,
16α-methyl-6α,20,20-trifluoroprogesterone,
6α-chloro-20,20-difluoro-16α-methylprogesterone,
11α-hydroxy-16α-methyl-6α,20,20-trifluoroprogesterone,
11α-acetoxy-16α-methyl-6α,20,20-trifluoroprogesterone,
11-keto-16α-methyl-6α,20,20-trifluoroprogesterone,
6α-chloro-20,20-difluoro-11α-hydroxy-16α-methylprogesterone,
6α-chloro-20,20-difluoro-11α-acetoxy-16α-methylprogesterone,
20,20-difluoro-6α,16α-dimethylprogesterone,
20,20-difluoro-11-keto-6α,16α-dimethylprogesterone,
20,20-difluoro-11α-hydroxy-6α,16α-dimethylprogesterone,
or 20,20-difluoro-11α-acetoxy-6α,16α-dimethylprogesterone, there are obtained the 5α- and 5β-epimers of 20,20-difluoropregnane-3,11-dione,
20,20-difluoropregnan-11α-ol-3-one,
20,20-difluoropregnan-11α-ol-3-one acetate,
6α,20,20-trifluoropregnan-3-one,
6α-chloro-20,20-difluoropregnan-3-one,
20,20-difluoro-6α-methylpregnan-3-one,
20,20-difluoro-6α-methylpregnan-11α-ol-3-one,
20,20-difluoro-6α-methylpregnan-11α-ol-3-one acetate,
20,20-difluoro-6α-methylpregnane-3,11-dione,
20,20-difluoro-16α-methylpregnan-3-one,
20,20-difluoro-16α-methylpregnan-11α-ol-3-one,
20,20-difluoro-16α-methylpregnan-11α-ol-3-one acetate,
20,20-difluoro-16α-methylpregnane-3,11-dione,
16α-methyl-6α,20,20-trifluoropregnan-3-one,
6α-chloro-20,20-difluoro-16α-methylpregnan-3-one,
16α-methyl-6α,20,20-trifluoropregnan-11α-ol-3-one,
16α-methyl-6α,20,20-trifluoropregnan-11α-ol-3-one acetate,
16α-methyl-6α,20,20-trifluoropregnane-3,11-dione,
6α-chloro-20,20-difluoro-16α-methylpregnan-11α-ol-3-one,
6α-chloro-20,20-difluoro-16α-methylpregnan-11α-ol-3-one acetate,
20,20-difluoro-6α,16α-dimethylpregnan-3-one,
20,20-difluoro-6α,16α-dimethylpregnane-3,11-dione,
20,20-difluoro-6α,16α-dimethylpregnan-11α-ol-3-one,
and 20,20-difluoro-6α,16α-dimethyl-pregnan-11α-ol-3-one acetate, respectively.

EXAMPLE 5

*3,3,20,20-tetrafluoropregnane*

Using the procedure described in Example 1, but substituting 20,20-difluoropregnan-3-one for progesterone, there is obtained 3,3,20,20-tetrafluoropregnane in the form of a crystalline solid.

Similarly, using the procedure described in Example 1, but replacing progesterone by 20,20-difluoropregnane-3,11-dione,
20,20-difluoropregnan-11α-ol-3-one acetate,
6α,20,20-trifluoropregnan-3-one,
6α-chloro-20,20-difluoropregnan-3-one,
20,20-difluoro-6α-methylpregnan-3-one,
20,20-difluoro-6α-methylpregnan-11α-ol-3-one acetate,
20,20-difluoro-6α-methylpregnane-3,11-dione,
20,20-difluoro-16α-methylpregnan-3-one,
20,20-difluoro-16α-methylpregnan-11α-ol-3-one acetate,
20,20-difluoro-16α-methylpregnane-3,11-dione,
16α-methyl-6α,20,20-trifluoropregnan-3-one,
6α-chloro-20,20-difluoro-16α-methylpregnan-3-one,
16α-methyl-6α,20,20-trifluoropregnan-11α-ol-3-one acetate,
16α-methyl-6α,20,20-trifluoropregnan-3,11-dione,
6α-chloro-20,20-difluoro-16α-methylpregnan-11α-ol-3-one acetate,
20,20-difluoro-6α,16α-dimethylpregnan-3-one,
20,20-difluoro-6α,16α-dimethylpregnane-3,11-dione,
or 20,20-difluoro-6α,16α-dimethylpregnan-11α-ol-3-one acetate, there are obtained 3,3,20,20-tetrafluoropregnan-11-one,
3,3,20,20-tetrafluoropregnan-11α-ol-3-one acetate,
3,3,6α,20,20-pentafluoropregnane,
6α-chloro-3,3,20,20-tetrafluoropregnane,
6α-methyl-3,3,20,20-tetrafluoropregnane,
6α-methyl-3,3,20,20-tetrafluoropregnan-11α-ol-3-one acetate,
6α-methyl-3,3,20,20-tetrafluoropregnan-11-one,
16α-methyl-3,3,20,20-tetrafluoropregnane,
16α-methyl-3,3,20,20-tetrafluoropregnan-11α-ol-3-one acetate,
16α-methyl-3,3,20,20-tetrafluoropregnan-11-one,
16α-methyl-3,3,6α,20,20-pentafluoropregnane,
6α-chloro-16α-methyl-3,3,20,20-tetrafluoropregnane,
16α-methyl-3,3,6α,20,20-pentafluoropregnan-11α-ol-3-one acetate,
16α-methyl-3,3,6α,20,20-pentafluoropregnan-11-one,
6α-chloro-16α-methyl-3,3,20,20-tetrafluoropregnan-11α-ol-3-one acetate,
6α,16α-dimethyl-3,3,20,20-tetrafluoropregnane,
6α,16α-dimethyl-3,3,20,20-tetrafluoropregnan-11-one,
and 6α,16α-dimethyl-3,3,20,20-tetrafluoropregnan-11α-ol-3-one acetate, respectively.

The compounds 3,3,20,20-tetrafluoropregnan-11α-ol-3-one acetate,
6α-methyl-3,3,20,20-tetrafluoropregnan-11α-ol-3-one acetate,
16α-methyl-3,3,20,20-tetrafluoropregnan-11α-ol-3-one acetate,
16α-methyl-3,3,6α,20,20-pentafluoropregnan-11α-ol-3-one acetate,
6α-chloro-16α-methyl-3,3,20,20-tetrafluoropregnan-11α-ol-3-one acetate,
and 6α,16α-dimethyl-3,3,20,20-tetrafluoropregnan-11α-ol-3-one acetate are deacetylated by heating with methanolic hydrochloric acid as described in Example 1, to obtain 3,3,20,20-tetrafluoropregnan-11α-ol-3-one,
6α-methyl-3,3,20,20-tetrafluoropregnan-11α-ol-3-one,
16α-methyl-3,3,20,20-tetrafluoropregnan-11α-ol-3-one,
16α-methyl-3,3,6α,20,20-pentafluoropregnan-11α-ol-3-one,
6α-chloro-16α-methyl-3,3,20,20-tetrafluoropregnan-11α-ol-3-one,
and 6α,16α-dimethyl-3,3,20,20-tetrafluoropregnan-11α-ol-3-one, respectively.

Example 6

*16α-methyl-5α-pregnane-3,20-dione and 16α-methyl-5β-pregnane-3,20-dione*

Using the procedure described in Example 4, but substituting 16α-methylprogesterone for 20,20-difluoroprogesterone, there are obtained 16α-methyl-5α-pregnane-3,20-dione and 16α-methyl-5β-pregnane-3,20-dione in the form of crystalline solids.

Similarly, using the procedure described in Example 3, but replacing 20,20-difluoroprogesterone by progesterone,
11α-acetoxyprogesterone,
6α-fluoroprogesterone,
6α-chloroprogesterone,
6α-methylprogesterone,
11-keto-6α-methylprogesterone,
11α-acetoxy-16α-methylprogesterone,
11-keto-16α-methylprogesterone,
6α-fluoro-16α-methylprogesterone,
6α-chloro-16α-methylprogesterone,
11α-acetoxy-6α-fluoro-16α-methylprogesterone,
6α-fluoro-11-keto-16α-methylprogesterone,
11α-acetoxy-6α-chloro-16α-methylprogesterone,
6α,16α-dimethylprogesterone,
6α,16α-dimethyl-11-ketoprogesterone, or
11α-acetoxy-6α,16α-dimethylprogesterone, there are obtained the 5α- and 5β-epimers of pregnane-3,20-dione,
pregnan-11α-ol-3,20-dione acetate,
6α-fluoropregnane-3,20-dione,
6α-chloropregnane-3,20-dione,
6α-methylpregnane-3,20-dione,
6α-methylpregnane-3,11,20-trione,
16α-methylpregnan-11α-ol-3,20-dione acetate,
16α-methylpregnane-3,11,20-dione,
6α-fluoro-16α-methylpregnane-3,20-dione,
6α-chloro-16α-methylpregnane-3,20-dione,
6α-fluoro-16α-methylpregnan-11α-ol-3,20-dione acetate,
6α-fluoro-16α-methylpregnane-3,11,20-trione,
6α-chloro-16α-methylpregnan-11α-ol-3,20-dione acetate,
6α,16α-dimethylpregnane-3,20-dione,
6α,16α-dimethylpregnane-3,11,20-dione, and
6α,16α-dimethylpregnan-11α-ol-3,20-dione acetate, respectively.

Example 7

*16α-methyl-3,3,20,20-tetrafluoro-5β-pregnane*

A mixture of 1 g. (0.0032 mole) of 16α-methyl-5β-pregnane-3,20-dione, 0.75 ml. (.042 mole) of water, and 20 ml. of methylene chloride is charged into a 100 ml. capacity stainless steel autoclave. The autoclave is sealed and cooled in an ice bath of Dry Ice and acetone while a total of 46 g. (.43 mole) of sulfur tetrafluoride is passed into the autoclave. The contents of the autoclave are then agitated for 16 hr. at 15° C. before being diluted with methylene chloride and washed with an excess of aqueous potassium bicarbonate solution. The washed methylene chloride solution is dried over anhydrous sodium sulfate, and the dried solution is filtered. The filtrate is evaporated to dryness and the residue is chromatographed on a column of magnesium silicate. The column is eluted with Skellysolve B containing increasing proportions of acetone. Those fractions of the eluate which are shown by infrared spectrum data and crystallization and melting behavior to contain the desired product are combined and recrystallized from a mixture of acetone and water. There is thus obtained 16α-methyl-3,3,20,20-tetrafluoro-5β-pregnane in the form of a crystalline solid.

Using the above procedure, but replacing 16α-methylpregnane-3,20-dione by

5β-pregnane-3,20-dione,
5β-pregnan-11α-ol-3,20-dione acetate,
6α-fluoro-5β-pregnane-3,20-dione,
6α-chloro-5β-pregnane-3,20-dione,
6α-methyl-5β-pregnane-3,20-dione,
6α-methyl-5β-pregnan-11α-ol-3,20-dione acetate,
6α-methyl-5β-pregnane-3,11,20-trione,
16α-methyl-5β-pregnan-11α-ol-3,20-dione acetate,
16α-methyl-5β-pregnane-3,11,20-dione,
6α-fluoro-16α-methyl-5β-pregnane-3,20-dione,
6α-chloro-16α-methyl-5β-pregnane-3,20-dione,
6α-fluoro-16α-methyl-5β-pregnan-11α-ol-3,20-dione acetate,
6α-fluoro-16α-methyl-5β-pregnane-3,11,20-trione,
6α-chloro-16α-methyl-5β-pregnan-11α-ol-3,20-dione acetate,
6α,16α-dimethyl-5β-pregnane-3,20-dione,
6α,16α-dimethyl-5β-pregnane-3,11,20-dione, or
6α,16α-dimethyl-5β-pregnan-11α-ol-3,20-dione acetate, there are obtained 3,3,20,20-tetrafluoro-5β-pregnane,
3,3,20,20-tetrafluoro-5β-pregnan-11α-ol acetate,
3,3,6α,20,20-pentafluoro-5β-pregnane,
6α-chloro-3,3,20,20-tetrafluoro-5β-pregnane,
6α-methyl-3,3,20,20-tetrafluoro-5β-pregnane,
6α-methyl-3,3,20,20-tetrafluoro-5β-pregnan-11α-ol acetate,
6α-methyl-3,3,20,20-tetrafluoro-5β-pregnan-11-one,
16α-methyl-3,3,20,20-tetrafluoro-5β-pregnan-11α-ol acetate,
16α-methyl-3,3,20,20-tetrafluoro-5β-pregnan-11-one,
16α-methyl-3,3,6α,20,20-pentafluoro-5β-pregnane,
6α-chloro-16α-methyl-3,3,20,20-tetrafluoro-5β-pregnane,
16α-methyl-3,3,6α,20,20-pentafluoro-5β-pregnan-11α-ol acetate,
16α-methyl-3,3,6α,20,20-pentafluoro-5β-pregnan-11-one,
6α-chloro-16α-methyl-3,3,20,20-tetrafluoro-5β-pregnan-11α-ol-acetate,
6α,16α-dimethyl-3,3,20,20-tetrafluoro-5β-pregnane,
6α,16α-dimethyl-3,3,20,20-tetrafluoro-5β-pregnan-11-one, and
6α,16α-dimethyl-3,3,20,20-tetrafluoro-5β-pregnan-11α-ol acetate, respectively.

The corresponding 5α-epimers can be obtained in the same manner by employing the 5α-epimers of the appropriate pregnane-3,20-dione.

The compounds 3,3,20,20-tetrafluoro-5β-pregnan-11α-ol acetate,
6α-methyl-3,3,30,20-tetrafluoro-5β-pregnan-11α-ol acetate,
16α-methyl-3,3,20,20-tetrafluoro-5β-pregnan-11α-ol acetate,
16α-methyl-3,3,6α,20,20-pentafluoro-5β-pregnan-11α-ol acetate,
6α-chloro-16α-methyl-3,3,20,20-tetrafluoro-5β-pregnan-11α-ol acetate, and
6α,16α - dimethyl - 3,3,20,20 - tetrafluoro-5β-pregnan-11α-ol acetate so obtained are deacetylated by refluxing with methanolic hydrochloric acid using the procedures described in Example 1 to obtain 3,3,20,20-tetrafluoro-5β-pregnan-11α-ol,
6α-methyl-3,3,20,20-tetrafluoro-5β-pregnan-11α-ol,
16α-methyl-3,3,20,20-tetrafluoro-5β-pregnan-11α-ol,
16α-methyl-3,3,6α,20,20-pentafluoro-5β-pregnan-11α-ol,
6α-chloro-16α-methyl-3,3,20,20-tetrafluoro-5β-pregnan-11α-ol and
6α,16α-dimethyl-3,3,20,20-tetrafluoro-5β-pregnan-11α-ol, respectively.

EXAMPLE 8

*11β-hydroxy-6α-methyl-3,3,20,20-tetrafluoro-5β-pregnane*

Using the procedure described in Example 3, part B, but replacing the 3-ethylene ketal of 20,20-difluoro-11-ketoprogesterone by 6α-methyl-3,3,20,20-tetrafluoro-5β-pregnan-11-one, there is obtained 11β-hydroxy-6α-methyl-3,3,20,20-tetrafluoro-5β-pregnane.

Using the same procedure, but replacing 6α-methyl-3,3,20,20-tetrafluoro-5β-pregnan-11-one by 16α-methyl-3,3,20,20-tetrafluoro-5β-pregnan-11-one,
16α-methyl-3,3,6α,20,20-pentafluoro-5β-pregnan-11-one, and
6α,16α-dimethyl-3,3,20,20-tetrafluoro-5β-pregnan-11-one, there are obtained 11β-hydroxy-16α-methyl-3,3,20,20-tetrafluoro-5β-pregnane,
11β-hydroxy-16α-methyl-3,3,6α,20,20-pentafluoro-5β-pregnane, and
11β-hydroxy-6α,16α-dimethyl-3,3,20,20-tetrafluoro-5β-pregnane.

The corresponding 5α-epimers can be obtained by employing the appropriate 5α-epimer of the starting material.

EXAMPLE 9

*6α-fluoro-20β-acetoxy-4-pregnen-3-one*

(a) *6α - fluoro - 20β - hydroxy - 4 - pregnen - 3 - one.*—A solution of 1 g. of 6α-fluoroprogesterone in 50 ml. of methanol is chilled to about 5° C. and treated with a solution of 57 mg. of potassium borohydride in 1 ml. of water (containing one drop of 5% aqueous sodium hydroxide solution) with rapid stirring. The stirring is continued for about 0.5 hr. after which the mixture is quenched with 50 ml. of water containing 0.5 ml. of acetic acid. The solution is concentrated under reduced pressure to give a mixture of 6α-fluoro-20β-hydroxy-4-pregnen-3-one and 6α-fluoro-20α-hydroxy-4-pregnen-3-one. The mixture so obtained is then dissolved in methylene chloride and chromatographed over synthetic magnesium silicate (Florisil). The column is eluted with Skellysolve B containing increasing proportions of acetone. The fractions are evaporated to dryness and the residues analyzed by paper strip chromatography. The fractions containing the first band of materials eluted from the column and showing essentially one spot on paper strip analysis are combined to give 6α-fluoro-20β-hydroxy-4-pregnen-3-one and later fractions showing one spot of a slightly more polar material are combined to give 6α-fluoro-20α-hydroxy-4-pregnen-3-one. The compounds so obtained can be purified further by recrystallization from a mixture of acetone and Skellysolve B.

(b) *6α-fluoro-20β-acetoxy-4-pregnen-3-one.*—A solution containing 50 mg. of 6α-fluoro-20β-hydroxy-4-pregnen-3-one in 1 ml. of pyridine and 1 ml. of acetic anhydride is allowed to stand at room temperature overnight and is then poured into ice water. The solid which separates is isolated by filtration and recrystallized from aqueous ethanol. There is thus obtained 6α-fluoro-20β-acetoxy-4-pregnen-3-one in the form of a crystalline solid.

By replacing 6α-fluoro-20β-hydroxy-4-pregnen-3-one by 6α-fluoro-20α-hydroxy-4-pregnen-3-one in the above acetylation, there is obtained 6α-fluoro-20α-acetoxy-4-pregnen-3-one. Similarly, by replacing 6α-fluoro-20β-hydroxy-4-pregnen-3-one by the mixture of 6α-fluoro-20β-hydroxy- and 6α-fluoro-20α-hydroxy-4-pregnen-3-one obtained in the above-described procedure, there is obtained a mixture of 6α-fluoro-20β-acetoxy- and 6α-fluoro-20α-acetoxy-4-pregnen-3-one.

By carrying out the procedure described in part (b) above but replacing acetic anhydride by the anhydride of other hydrocarbon carboxylic acids, there are obtained the corresponding 6α - fluoro - 20β - acyloxy - 4 - pregnen-3-ones.

Using the procedure described in parts (a) and (b) above but replacing the 6α-fluoroprogesterone, employed in part (a), by progesterone, 11α-acetoxyprogesterone, 6α-chloroprogesterone, 6α-methylprogesterone, 11α-acetoxy-6α-methylprogesterone, 11α-acetoxy-16α-methylprogesterone, 6α-fluoro-16α-methylprogesterone, 6α-chloro-16α-methylprogesterone, 11α-acetoxy-6α-fluoro-16α-methylprogesterone, 11α-acetoxy-6α-chloro-16α-methylprogesterone, 6α,16α-dimethylprogesterone, or 11α-acetoxy-6α,16α-dimethylprogesterone, there are obtained 20β-acetoxy-4-pregnen-3-one, 11α,20β-diacetoxy-4-pregnen-3-one, 6α - chloro - 20β - acetoxy - 4 - pregnen - 3 - one, 6α-methyl-20β-acetoxy-4-pregnen-3-one, 6α-methyl-11α,20β-diacetoxy-4-pregnen-3-one, 16α-methyl-11α,20β-diacetoxy-4 - pregnen - 3 - one, 6α - fluoro - 16α - methyl - 20β - acetoxy-4-pregnen-3-one, 6α-chloro-16α-methyl-20β-acetoxy-4-pregnen-3-one, 6α-fluoro-16α-methyl-11α,20β-diacetoxy-4-pregnen-3-one, 6α-chloro-16α-methyl-11α,20β-diacetoxy-4-pregnen-3-one, 6α,16α-dimethyl-20β-acetoxy-4-pregnen-3-one, and 6α,16α-dimethyl-11α,20β-diacetoxy-4-pregnen-3-one, respectively.

EXAMPLE 10

*6α-fluoro-20β-acetoxy-5α-pregnan-3-one and 6α-fluoro-20β-acetoxy-5β-pregnan-3-one*

Using the procedure described in Example 4, but substituting 6α-fluoro-20β-acetoxy-4-pregnen-3-one for 20,20-difluoroprogesterone, there are obtained 6α-fluoro-20β-acetoxy-5α-pregnan-3-one and 6α-fluoro-20β-acetoxy-5β-pregnan-3-one in the form of crystalline solids.

Similarly, by substituting 6α - fluoro - 20α - acetoxy - 4-pregnen-3-one or the mixture of 6α-fluoro-20β-acetoxy- and 6α-fluoro-20α-acetoxy-4-pregnen-3-ones (obtained as described in Example 7) for 6α-fluoro-20β-acetoxy-4-pregnen-3-one in the above procedure, there are obtained the 5α- and 5β-epimers of 6α-fluoro-20α-acetoxypregnan-3-one or a mixture of 6α-fluoro-20α-acetoxy- and 6α-fluoro-20β-acetoxy-5α- and 5β-pregnan-3-ones, respectively.

In like manner, employing the procedure described in Example 4 but replacing 20,20-difluoroprogesterone by 20β - acetoxy - 4 - pregnen - 3 - one, 11α,20β - diacetoxy-4-pregnen-3-one, 6α-chloro-20β-acetoxy-4-pregnen-3-one, 6α - methyl - 20β - acetoxy - 4 - pregnen - 3 - one, 6α-methyl - 11α,20β - diacetoxy - 4 - pregnen - 3 - one, 16α-methyl - 11α,20β - diacetoxy - 4 - pregnen - 3 - one, 6α-fluoro-16α-methyl-20β-acetoxy-4-pregnen-3-one, 6α-chloro - 16α - methyl - 20β - acetoxy - 4 - pregnen - 3 - one, 6α-fluoro - 16α - methyl - 11α,20β - diacetoxy - 4 - pregnen-3 - one, 6α - chloro - 16α - methyl - 11α,20β - diacetoxy-4-pregnen-3-one, 6α,16α-dimethyl-20β-acetoxy-4-pregnen-3-one, or 6α,16α-dimethyl-11α,20β-acetoxy-4-pregnen-3-one, there are obtained the 5α- and 5β-epimers of 20β-acetoxypregnan - 3 - one, 11α,20β - diacetoxypregnan - 3-one, 6α-chloro-20β-acetoxypregnan-3-one, 6α-methyl-20β-acetoxypregnan-3-one, 6α-methyl-11α,20β-diacetoxypregnan - 3-one, 16α - methyl - 11α,20β - diacetoxypregnan-3-one, 6α-fluoro-16α-methyl-20β-acetoxypregnan-3-one, 6α-chloro-16α-methyl-20β-acetoxypregnan-3-one, 6α-fluoro-16α-methyl-11α,20β-diacetoxypregnan-3-one, 6α-chloro-16α-methyl-11α,20β-diacetoxypregnan-3-one, 6α,16α-dimethyl-20β-acetoxypregnan-3-one and 6α,16α-dimethyl-11α,20β-diacetoxypregnan-3-one, respectively.

EXAMPLE 11

*20β-acetoxy-3,3,6α-trifluoro-5β-pregnane*

Using the procedure described in Example 1, but substituting 6α-fluoro-20β-acetoxy-5β-pregnan-3-one for progesterone, there is obtained 20β-acetoxy-3,3,6α-trifluoro-5β-pregnane in the form of a crystalline solid.

In like manner using the procedure of Example 1, but replacing progesterone by 20β-acetoxy-5β-pregnan-3-one, 11α,20β - diacetoxy - 5β - pregnan - 3 - one, 20β - acetoxy-6α-chloro-5β-pregnan-3-one, 20β-acetoxy-6α-methyl-5β-pregnan-3-one, 11α,20β-diacetoxy-6α-methyl-5β-pregnan - 3 - one, 11α,20β - diacetoxy - 16α - methyl - 5β-pregnan - 3 - one, 20β - acetoxy - 6α - fluoro - 16α - methyl-5β-pregnan-3-one, 20β-acetoxy-6α-chloro-16α-methyl-5β-pregnan-3-one, 11α,20β-diacetoxy-6α-fluoro-16α-methyl - 5β - pregnan - 3 - one, 6α - chloro - 11α,20β - diacetoxy - 16α - methyl - 5β - pregnan - 3 - one, 20β - acetoxy-6α,16α-dimethyl-5β-pregnan-3-one or 11α,20β-diacetoxy-6α,16α-dimethyl-5β-pregnan-3-one, there are obtained 20β - acetoxy - 3,3 - difluoro - 5β - pregnane, 11α,20β-diacetoxy,3,3-difluoro-5β-pregnane, 20β-acetoxy-6α-chloro-3,3-difluoro-5β-pregnane, 20β-acetoxy-3,3-difluoro-6α-methyl - 5β - pregnane, 11α,20β - diacetoxy - 3,3 - difluoro - 6α - methyl - 5β - pregnane, 11α,20β - diacetoxy - 3,3 - difluoro - 16α - methyl - 5β - pregnane, 20β - acetoxy - 16α - methyl - 3,3,6α - trifluoro - 5β - pregnane, 20β-acetoxy - 6α - chloro - 3,3 - difluoro - 16α - methyl - 5β-pregnane, 11α,20β - diacetoxy - 16α - methyl - 3,3,6α-trifluoro - 5β - pregnane, 6α - chloro - 11α,20β - diacetoxy-3,3-difluoro-16α-methyl-5β-pregnane, 20β-acetoxy-3,3-difluoro-6α,16α-dimethyl-5β-pregnane, and 11α,20β-diacetoxy - 3,3 - difluoro - 6α,16α - dimethyl - 5β - pregnane, respectively.

The corresponding 5α-epimers are obtained in a like manner using the 5α-epimer of the appropriate starting material.

EXAMPLE 12

*3,3,6α-trifluoro-5β-pregnan-20β-ol*

A solution of 5 g. of 20β-acetoxy-3,3,6α-trifluoro-5β-pregnane in 500 ml. of methanol and 48 ml. of concentrated hydrochloric acid is heated under reflux for 30 minutes before being diluted with 100 ml. of water and concentrated under reduced pressure to about 125 ml. The solid which separates is isolated by filtration, washed with water and dried. There is thus obtained 3,3,6α-trifluoro-5β-pregnan-20β-ol in the form of a crystalline solid.

In like manner

20β-acetoxy-3,3-difluoro-5β-pregnane,
11α,20β-diacetoxy-3,3-difluoro-5β-pregnane,
20β-acetoxy-6α-chloro-3,3-difluoro-5β-pregnane,
20β-actoxy-3,3-difluoro-6α-methyl-5β-pregnane,
11α,20β-diacetoxy-3,3-difluoro-6α-methyl-5β-pregnane,
11α,20β-diacetoxy-3,3-difluoro-16α-methyl-5β-pregnane,
20β-acetoxy-16a-methyl-3,3,6α-trifluoro-5β-pregnane,
20β-acetoxy-6α-chloro-3,3-difluoro-16α-methyl-5β-pregnane,
11α-20β-diacetoxy-16α-methyl-3,3,6α-trifluoro-5β-pregnane,
6a-chloro-11α-20β-diacetoxy-3,3-difluoro-16α-methyl-5β-pregnane,
20β-acetoxy-3,3-difluoro-6a,16α-dimethyl-5β-pregnane, and
11α,20β-diacetoxy-3,3-difluoro-6α,16α-dimethyl-5β-pregnane are deacetylated to yield
3,3-difluoro-5β-pregnane-20β-ol,
3,3-difluoro-5β-pregnane-11α,20β-diol,
6α-chloro-3,3-difluoro-5β-pregnane-20β-ol,
3,3-difluoro-6α-methyl-5β-pregnan-20β-ol,
3,3-difluoro-6α-methyl-5β-pregnane-11α,20β-diol,
3,3-difluoro-16α-methyl-5β-pregnane-11α,20β-diol,
16α-methyl-3,3,6α-trifluoro-5β-pregnan-20β-ol,
6α-chloro-3,3-difluoro-16α-methyl-5β-pregnan-20β-ol,
16α-methyl-3,3,6α-trifluoro-5β-pregnane-11α,20β-diol,
6α-chloro-3,3-difluoro-16α-methyl-5β-pregnane-11α,20β-diol,
3,3-difluoro-6α,16α-dimethyl-5β-pregnan-20β-ol, and
3,3-difluoro-6α,16α-dimethyl-5β-pregnane-11a,20β-diol, respectively.

The corresponding 5α-epimers are obtained in like manner using the 5α-epimers of the appropriate starting material.

EXAMPLE 13

*3,3,6α-trifluoro-5β-pregnan-20-one*

To a solution of 1 g. of 3,3,6α-trifluoro-5β-pregnan-20β-ol and 2 ml. of pyridine in 5 ml. of tertiary butyl alcohol is added 0.5 g. of N-bromoacetamide. The mixture is maintained at room temperature for about 16 hr. before adding 50 ml. of water containing 0.5 g. of sodium sulfite. The resulting mixture is then concentrated under reduced pressure to a volume of about 40 ml. and the concentrate is cooled at about 0° C. for a short period. The solid which has separated is isolated by filtration, washed with water and dried. There is thus obtained 3,3,6α-trifluoro-5β-pregnan-20-one in the form of a crystalline solid.

In like manner, but replacing 3,3,6α-trifluoro-5β-pregnan-20β-ol by the following compounds (and employing twice the quantity of N-bromoacetamide where the starting material contains two hydroxy groups to be oxidized):

3,3-difluoro-5β-pregnan-20β-ol,
3,3-difluoro-5β-pregnan-11α,-20β-ol,
6α-chloro-3,3-difluoro-5β-pregnan-20β-ol,
3,3-difluoro-6α-methyl-5β-pregnan-20β-ol,
3,3-difluoro-6α-methyl-5β-pregnane-11α,20β-diol,
3,3-difluoro-16α-methyl-5β-pregnane-11α,20β-diol,
16α-methyl-3,3,6α-trifluoro-5β-pregnan-20β-ol,
6α-chloro-3,3-difluoro-16α-methyl-5β-pregnan-20β-ol,
16α-methyl-3,3,6α-trifluoro-5β-pregnane-11α,20β-diol,
6α-chloro-3,3-difluoro-16α-methyl-5β-pregnane-11α,20β-diol,
3,3-difluoro-6α,16α-dimethyl-5β-pregnan-20β-ol, and
3,3-difluoro-6α,16α-dimethyl-5β-pregnane-11α,20β-diol, there are obtained 3,3-difluoro-5β-pregnan-20-one,
3,3-difluoro-5β-pregnane-11,20-dione,
6α-chloro-3,3-difluoro-5β-pregnan-20-one,
3,3-difluoro-6α-methyl-5β-pregnan-20-one,
3,3-difluoro-6α-methyl-5β-pregnane-11,20-dione,
3,3-difluoro-16α-methyl-5β-pregnane-11,20-dione,
16α-methyl-3,3,6α-trifluoro-5β-pregnan-20-one,
6α-chloro-3,3-difluoro-16α-methyl-5β-pregnan-20-one,
16α-methyl-3,3,6α-trifluoro-5β-pregnane-11,20-dione,
6α-chloro-3,3-difluoro-16α-methyl-5β-pregnane-11,20-dione,
3,3-difluoro-6α,16α-dimethyl-5β-pregnan-20-one, and
3,3-difluoro-6α,16α-dimethyl-5β-pregnane-11,20-dione, respectively.

The corresponding 5α-epimers are obtained in like manner using the 5α-epimer of the appropriate starting material.

EXAMPLE 14

*3,3-difluoro-5β-pregnan-11α-ol-20-one*

A solution containing 10 g. of 3,3-difluoro-5β-pregnane-11,20-dione and 0.5 g. of p-toluenesulfonic acid in 100 ml. of benzene and 20 ml. of ethylene glycol is refluxed vigorously with rapid stirring for 4 hr. using a water trap to remove the water formed in the reaction. The resulting solution is cooled, washed with aqueous sodium bicarbonate solution, then with water and dried. The dried solution is evaporated and to the residue is added hot ethyl acetate. The hot solution so obtained is cooled and diluted with Skellysolve B and the solid which separates is isolated by filtration and dried. There is thus obtained the 20-monoethylene-ketal of 3,3-difluoro-5β-pregnane-11,20-dione in the form of a crystalline solid.

To a solution of 2 g. of the monoethyleneketal so obtained in 150 ml. of absolute ethanol is added a total of 12 g. of finely divided sodium at such a rate that the solution is maintained at the boiling point. When all the sodium has dissolved, the solution is cooled and water is added to decompose the sodium ethoxide. An excess of water is then added and the solid which separates is isolated by filtration, washed with water and dried. The 20-monoethylene ketal of 3,3-difluoro-5β-pregnan-11α-ol-20- one so obtained is dissolved in anhydrous acetone containing about 0.1 g. of p-toluenesulfonic acid and the mixture is allowed to stand for 24 hr. at about 25° C. The reaction mixture is then poured into water and the solid which separates is isolated by filtration, washed with water and recrystallized from aqueous alcohol. There is obtained 3,3-difluoro-5β-pregnan-11α-ol-20-one in the form of a crystalline solid.

Using the above procedure but replacing 3,3-difluoro-5β-pregnane-11,20-dione by 3,3-difluoro-16α-methyl-5β-pregnane-11,20-dione,
16α-methyl-3,3,6α-trifluoro-5β-pregnane,11,20-dione,
6α-chloro-3,3-difluoro-16α-methyl-5β-pregnane-11,20-dione, or
3,3-difluoro-6α 16α-dimethyl-5β-pregnane-11,20-dione
there are obtained
3,3-difluoro-16α-methyl-5βpregnan-11α-ol-20-one,
16α-methyl-3,3,6α-trifluoro-5β-pregnan-11α-ol-20-one,
6α-chloro-3,3-difluoro-16α-methyl-5β-pregnan-11α-ol-20-one, and
3,3-difluoro-6α,16α-dimethyl-5β-pregnan-11α-ol-20-one, respectively. Similarly, by employing the 5α-epimer of the appropriate starting material there are obtained the corresponding 5α-epimers.

EXAMPLE 15

*3,3-difluoro-5β-pregnan-11β-ol-20-one*

Using the procedure described in Example 3, parts A, B, and C, but replacing 20,20-difluoro-11-ketoprogesterone in part A by 3,3-difluoro-5β-pregnane-11,20-dione, there is obtained 3,3-difluoro-5β-pregnan-11β-o1-20-one in the form of a crystalline solid.

Using the above procedure, but replacing 3,3-difluoro-5β-pregnane-11,20-dione by
3,3-difluoro-16α-methyl-5β-pregnane-11,20-dione,
16α-methyl-3,3,6α-trifluoro-5β-pregnane-11,20-dione,
6α-chloro-3,3-difluoro-16α-methyl-5β-pregnane-11,20-dione, or
3,3-difluoro-6α,16α-dimethyl-5β-pregnane-11,20-dione
there are obtained
3,3-difluoro-16α-methyl-5β-pregnan-11β-ol-20-one,
16α-methyl,3,3,6α-trifluoro-5β-pregnan-11β-ol-20-one,
6α-chloro-3,3-difluoro-16α-methyl-5β-pregnan-11β-ol-20-one, and
3,3-difluoro-6α,16α-dimethyl-5β-pregnan-11β-ol-20-one, respectively.

Similarly, the corresponding 5α-epimers can be obtained by employing the 5α-epimers of the appropriate starting materials.

EXAMPLE 16

*20,20-difluoro-5β-pregnan-3α-ol acetate*

Using the procedure described in Example 1, but substituting 5β-pregnan-3α-ol-20-one acetate (Meystre et al., Helv. Chim. Acta, 29, 33, 1946) for progesterone, there was obtained 20,20-difluoro-5β-pregnan-3α-ol acetate in the form of a crystalline solid having a melting point of 90 to 91.5° C.

*Analysis*—Calcd. for $C_{23}H_{34}O_3F_2$: C, 72.21; H, 9.49; F, 9.93. Found: C, 72.23; H, 9.65; F, 10.23.

EXAMPLE 17

*20,20-difluoro-5β-pregnan-3α-ol-11-one acetate*

Using the procedure described in Example 1, but substituting 5β-pregnan-3α-ol-11,20-dione acetate (Euw et al., Helv. Chim. Acta, 27, 821, 1944) for progesterone, there was obtained 20,20-difluoropregnan-3α-ol-11-one acetate in the form of a crystalline solid having a melting point of 139 to 140.5° C.

*Analysis*—Calcd. for $C_{23}H_{30}O_4F_2$: C, 69.66; H, 8.64; F, 9.58. Found: C. 69.57; H, 8.56; F, 10.15.

In like manner using the abobe procedure, but replacing 5β-pregnan-3α-ol-11,20-dione acetate by 6α-fluoro-16α-methyl-5β-pregnan-3α-ol-20-one acetate, 6α-fluoro-16α-methyl-5α-pregnan-3β-ol-20-one acetate,
6α-chloro-16α-methyl-5β-pregnan-3α-ol-20-one acetate,
6α-chloro-16α-methyl-5α-pregnan-3β-ol-20-one acetate,
6α-methyl-5β-pregnan-3α-ol-20-one acetate,
6α-methyl-5α-pregnan-3β-ol-20-one acetate,
6α,16α-dimethyl-5β-pregnan-3α-ol-20-one acetate, and
6α,16α-dimethyl-5α-pregnan-3β-ol-20-one acetate there are obtained
6α,20,20-trifluoro-16α-methyl-5β-pregnan-3α-ol acetate,
6α,20,20-trifluoro-16α-methyl-5α-pregnan-3β-ol acetate,
6α-chloro-20,20-difluoro-16α-methyl-5β-pregnan-3α-ol acetate,
6α-chloro-20,20-difluoro-16α-methyl-5α-pregnan-3β-ol acetate,
20,20-difluoro-6α-methyl-5β-pregnan-3α-ol acetate,
20,20-difluoro-6α-methyl-5α-pregnan-3β-ol-acetate,
20,20-difluoro-6α,16α-dimethyl-5β-pregnan-3α-ol acetate, and
20,20-difluoro-6α,16α-dimethyl-5α-pregnan-3β-ol acetate, respectively.

EXAMPLE 18

*20,20-difluoro-5β-pregnan-3-one*

Using the procedure described in Example 12, but replacing 20β-acetoxy-3,3,6α - trifluoro-5β-pregnane by 20,20-difluoro-5β-pregnan-3α-ol acetate, there is obtained 20,20-difluoro-5β-pregnan-3α-ol. The latter compound is then oxidized using the procedure described in Example 13 to obtain 20,20-difluoro-5β-pregnan-3-one in the form of a crystalline solid.

Using the above hydrolysis and oxidation procedures, 20,20-difluoro-5β-pregnan-3α-ol-11-one acetate,
6α,20,20-trifluoro-16α-methyl-5β-pregnan-3α-ol acetate,
6α,20,20-trifluoro-16α-methyl-5α-pregnan-3β-ol acetate,
6α-chloro-20,20-difluoro-16α-methyl-5β-pregnan-3α-ol acetate,
6α-chloro-20,20-difluoro-16α-methyl-5α-pregnan-3β-ol acetate,
20,20-difluoro-6α-methyl-5β-pregnane-3a-ol acetate,
20,20-difluoro-6α-methyl-5α-pregnan-3β-ol acetate,
20,20-difluoro-6α,16α-dimethyl-5β-pregnan-3α-ol-acetate, and
20,20-difluoro-6α,16α-dimethyl-5α-pregnan-3β-ol acetate,
are converted to
20,20-difluoro-5β-pregnane-3,11-dione,
6α,20,20-trifluoro-16α-methyl-5β-pregnan-3-one,
6α,20,20-trifluoro-16α-methyl-5α-pregnan-3-one,
6α-chloro-20,20-difluoro-16α-methyl-5β-pregnan-3-one,
6α-chloro-20,20-difluoro-16α-methyl-5α-pregnan-3-one,
20,20-difluoro-6α-methyl-5β-pregnan-3-one,
20,20-difluoro-6α-methyl-5α-pregnan-3-one,
20,20-difluoro-6α,16α-dimethyl-5β-pregnan-3-one, and
20,20-difluoro-6α,16α-dimethyl-5α-pregnan-3-one, respectively.

We claim:

1. A compound selected from the class consisting of compounds having the formulae:

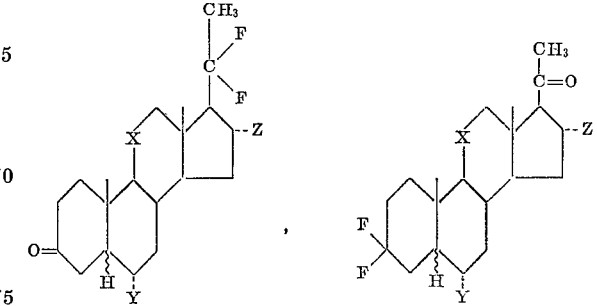

and

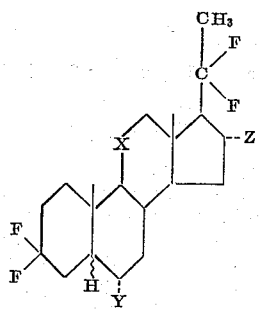

wherein X is selected from the class consisting of hydroxymethylene and keto, Y is selected from the class consisting of hydrogen, methyl, fluorine and chlorine, and Z is selected from the class consisting of hydrogen and methyl.

2. A 20,20-difluoropregnene having the formula:

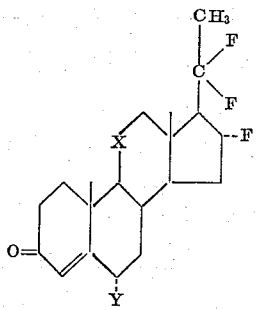

wherein X is selected from the class consisting of hydroxymethylene, and keto, Y is selected from the class consisting of hydrogen, methyl, fluorine and chlorine, and Z is selected from the class consisting of hydrogen and methyl.

3. 20,20-difluoro-11-ketoprogesterone.

4. A 3,3-difluoropregnane having the formula:

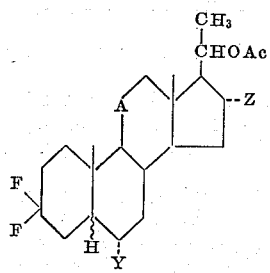

wherein A is selected from the class consisting of methylene and

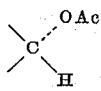

Y is selected from the class consisting of hydrogen, methyl, fluorine, and chlorine, Z is selected from the class consisting of hydrogen and methyl, and Ac is the acyl radical of a hydrocarbon carboxylic acid containing from 1 to 12 carbon atoms, inclusive.

5. A 3,3-difluoropregnane having the formula:

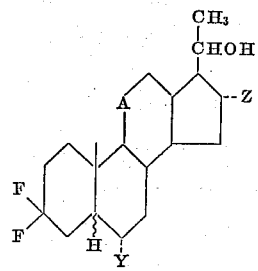

wherein A is selected from the class consisting of methylene and hydroxymethylene, Y is selected from the class consisting of hydrogen, methyl, fluorine, and chlorine, and Z is selected from the class consisting of hydrogen and methyl.

6. A 20,20-difluoropregnane having the formula:

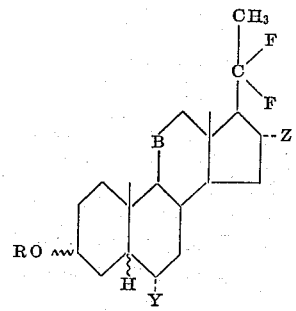

wherein B is selected from the class consisting of methylene, keto, α-hydroxymethylene, and α-acyloxymethylene wherein the acyl group is that of a hydrocarbon carboxylic acid containing from 1 to 12 carbon atoms, inclusive, R is selected from the class consisting of H and the acyl group of a hydrocarbon carboxylic acid containing from 1 to 12 carbon atoms, inclusive, Y is selected from the class consisting of hydrogen, methyl, fluorine, and chlorine, and Z is selected from the class consisting of hydrogen and methyl.

7. 20,20-difluoro-5β-pregnan-3α-ol acetate.

8. 20,20-difluoro-5β-pregnan-3α-ol-11-one acetate.

References Cited in the file of this patent

UNITED STATES PATENTS 2,859,245   Smith _____ Nov. 4, 1958

UNITED STATES PATENT OFFICE
CERTIFICATE OF CORRECTION

Patent No. 3,171,845　　　　　　　　　　　　　　　　　March 2, 1965

David G. Martin et al.

It is hereby certified that error appears in the above numbered patent requiring correction and that the said Letters Patent should read as corrected below.

Column 10, line 51, for "oxidopregnan-2-one" read -- oxidopregnan-20-one --; column 24, line 4, for "5 ml." read -- 75 ml. --; column 27, lines 2 to 14, for that portion of the formula reading

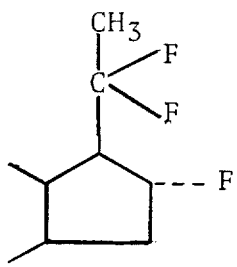　　　　read　　　　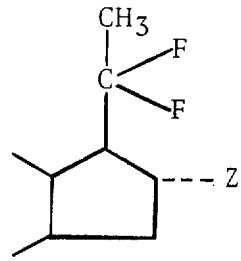

Signed and sealed this 15th day of February 1966.

(SEAL)
Attest:

ERNEST W. SWIDER　　　　　　　　　　　　　EDWARD J. BRENNER
Attesting Officer　　　　　　　　　　　　Commissioner of Patents